United States Patent
Toyomura et al.

(10) Patent No.: US 6,567,192 B1
(45) Date of Patent: May 20, 2003

(54) IMAGE READING APPARATUS

(75) Inventors: Yuji Toyomura, Fukuoka (JP);
Masakazu Mizusaki, Fukuoka (JP);
Shoichi Kitagawa, Fukuoka (JP);
Masanobu Narazaki, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/423,896

(22) PCT Filed: Mar. 16, 1999

(86) PCT No.: PCT/JP99/01287
§ 371 (c)(1),
(2), (4) Date: Mar. 1, 2000

(87) PCT Pub. No.: WO99/48277
PCT Pub. Date: Sep. 23, 1999

(30) Foreign Application Priority Data

Mar. 17, 1998 (JP) ............................................. 10-066584
Mar. 27, 1998 (JP) ............................................. 10-080858
Oct. 15, 1998 (JP) ............................................. 10-293532

(51) Int. Cl.[7] ................................................. H04N 1/04
(52) U.S. Cl. ....................................... 358/497; 358/525
(58) Field of Search ........................ 358/1.5, 512, 520, 358/525, 453, 497; 382/300, 274, 299, 239

(56) References Cited

U.S. PATENT DOCUMENTS 5,418,556 A * 5/1995 Andrews ..................... 347/116
2001/0046331 A1 * 11/2001 Altunbasak ................. 382/299

FOREIGN PATENT DOCUMENTS

| JP | 60-16762 | 1/1985 | ............ H04M/1/04 |
| JP | 8-111774 | 4/1996 | |
| JP | 9-214702 | 8/1997 | |

* cited by examiner

Primary Examiner—Jerome Grant, II
Assistant Examiner—Negussie Worku
(74) Attorney, Agent, or Firm—McDermott, Will & Emery

(57) ABSTRACT

An image reading apparatus for reading a original line by line, by moving the line image sensor in a direction orthogonal to the line, in which the line sensor is displaced in the line direction in each line to read the image of the original in a checkered pattern of pixels, and for interpolating a pixel in spaces of the said checkered pattern, plural interpolation candidate values for the pixel are determined and one of them is selected according to surrounding pixel values of the said pixel position to be interpolated, thereby reproducing edge portion of the original accurately.

10 Claims, 18 Drawing Sheets

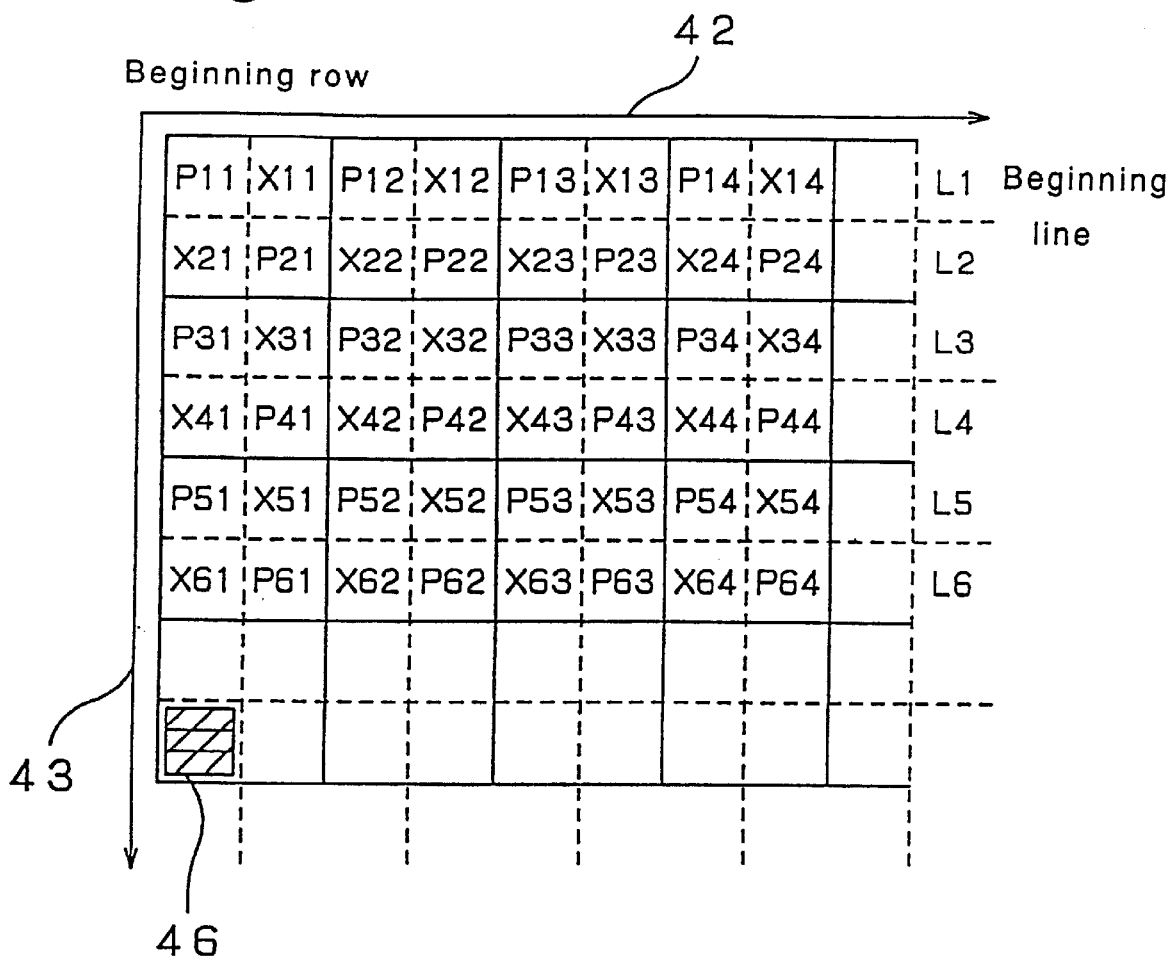

Fig 11

| Xnw | Pn | Xne |
|-----|----|----|
| Pw  | Xc | Pe |
|     | Ps |    |

Fig 12

| Xnw | Pn | Xne |
|-----|----|----|
| Pw  | Xc | Pe |
|     | Ps |    | ously
IMAGE READING APPARATUS

FIELD OF THE INVENTION

The present invention relates to enhancement of resolution of an image reading apparatus for reading an original image.

BACKGROUND OF THE INVENTION

An image reading apparatus is used as an image input unit for facsimile machines copier, computer, etc. The image reading method using a line image sensor having photoelectric converters arranged in a line is widely employed for its excellent total performance capability including the reading precision and speed. In a basic method, the line image sensor reads each line of the original image, and further moves to orthogonal direction (sub-scanning direction) to the line direction (main scanning direction) at intervals corresponding to the reading pixel interval in the line direction, thereby reading the image. On the other hand, in the background of sophistication of information processing and multimedia trend, a demand for enhancement of resolution of image reading apparatus is increased. Methods for enhancing the resolution of image reading apparatus include a method of increasing the precision of optical system such as the lens system and also increasing the density of photoelectric converters, and a method of reading different regions on the same line with the same line image sensor by changing over the optical system, but they are expensive because of the precise mounting procedure and complexity of mechanism.

Accordingly, it is proposed to increase the resolution by reading the image in the sub-scanning direction at the half line interval of the original. In this method, the reading density in the sub-scanning direction is double, but since the size of the pixels to be read is not changed, the resolution in the sub-scanning direction is increased but is not actually doubled. Further, in the main scanning direction, pixels are inserted between the pixels that have been already read, to make the pixel density equal in both main scanning and sub-scanning directions, and the value of the inserted pixels are given by the interpolating value of either adjacent pixel of the scanning direction or the average of both adjacent pixels. By this interpolation, the smoothness in the main scanning direction is improved, but the resolution is not increased.

In other method proposed to improve these points, every time the line image sensor is moved in the sub-scanning direction at the half line interval of the original, it is also moved in the main scanning direction reciprocally at the half pixel interval of the original, and the image pixels is read to obtain a checkered pixel plane, and the pixels in the interval are interpolated by the average of adjacent four pixels, so that the resolution is equalized in the main and sub-scanning directions. In this method, the resolution increased in the sub-scanning direction obtained by the above reading method is decreased in the sub-scanning direction and increased in the main scanning direction. In other words, the resolution once increased to double as the value in the ideal state in the sub-scanning direction is distributed only about $\sqrt{2}$ times at most in the main scanning and sub-scanning directions.

The interpolation by the average used in both methods increases the smoothness of the image by nature, but blunts the contract in the edge of the image.

SUMMARY OF THE INVENTION

The invention presents a novel method to improve the resolution of the read image, and particularly reproduce edges of the original image at an excellent contrast, which is moving the line image sensor in the main scanning direction reciprocally at the half pixel interval of the original also every time scanning in the sub-scanning direction at the half line interval of the original, reading the image pixels, obtaining a checkered pixel plane of pixels being read, interpolating pixels of spaces in the said checkered pixel plane by utilizing the information of adjacent pixels to the pixels to be interpolated, and so in principle doubling the resolution in both main and sub-scanning directions.

Basically, plural interpolation candidate values for every pixel to be interpolated are calculated with the adjacent pixel values, and one of them is selected and interpolated.

One of its specific methods is a method of calculating the average values of all combinations of two pixels among the four adjacent pixels as the candidate values for every pixel to be interpolated, and selecting and interpolating the candidate value of the combination of two pixels having the minimum difference of the values.

In a modified method, alternatively, combinations of two pixels may be limited in two scanning directions.

For every pixel to be interpolated, in other method, when the direction of the two pixels having the minimum difference among all combinations of two elements of the four adjacent pixels, coincides with the two scanning directions, the candidate value determined from the values of the two pixels is selected, and when the direction of the two pixels differs from the scanning direction, the combination of two pixels is selected by referring to the value of the already interpolated pixel in the direction of the combination of the two pixels, and the candidate value determined from these values is selected and interpolated.

In a further different method, for every pixel to the interpolated, plural candidate values are determined from the values of the four adjacent pixels, and separately using values of several interpolated pixels adjacent to these four adjacent pixels, the predicted value for the pixel to be interpolated is determined, and the candidate value close to this predicted value is selected and interpolated.

When reading a color image, meanwhile, in all interpolating methods mentioned above, the candidate value of each pixel to be interpolated is selected according to the value of the luminosity to be combined from the values of the pixels of plural primary color images being read, or the values of the pixels of the green primary color images being read, and interpolated in every pixel of every color.

Moreover, to read each one of the pixels of the checkered pattern precisely, the voltage waveform for driving the actuator for moving the image sensor slightly in reciprocal motions must be kept as flat as possible at the reading position, and inclines steeply when moving so as to be connected smoothly, and its method is also disclosed.

For interpolation of pixels, a method of keeping the image sensor position always constant when starting image reading, and a method of obtaining a favorable checkered pixel plane also when resuming after interrupting reading are further disclosed.

The image reading apparatus of the invention employing these methods enhances the resolution of the read image, and reproduces the edges of the original image at excellent contrast in particular, and thereby contributes greatly to the progress of the information society, in particular, the multimedia society.

BRIEF DESCRIPTION OF THE DRAWINGS

FIG. 7 is a symbol map of read pixels in FIG. 6 and pixels to be interpolated;

FIG. 8 is a symbol map of interpolating pixels and adjacent; pixels;

FIG. 11 is a diagram showing a window of interpolating method 3;

FIG. 12 is a diagram showing a window of interpolating method 4;

DESCRIPTION OF THE PREFERRED EMBODIMENTS

Outline of Image Reading Apparatus

Figure 1:
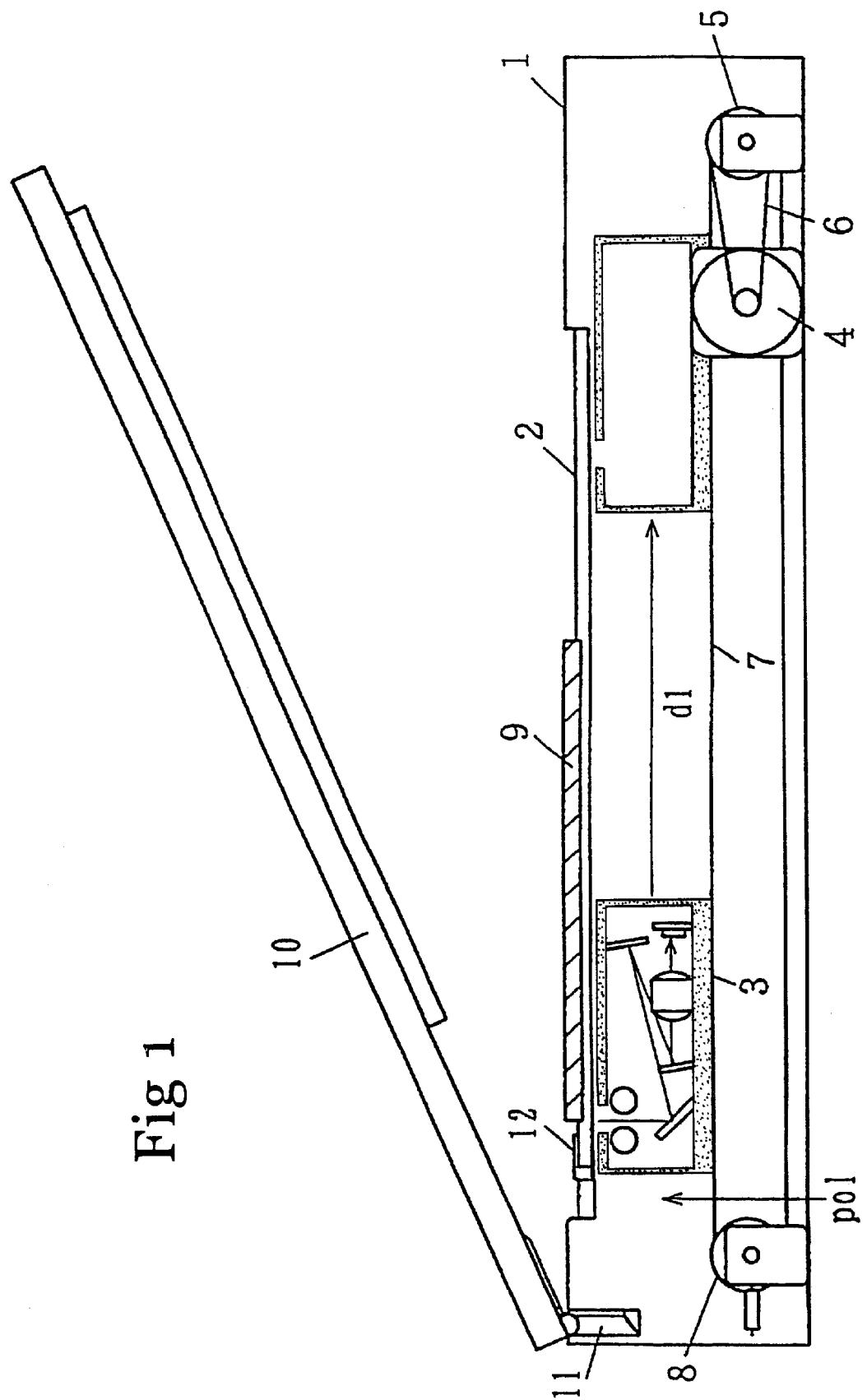
FIG. 1 is all structural diagram schematically showing a general image reading apparatus.

Referring first to FIG. 1, an outline is described about a general flatbed type image reading apparatus using a line image sensor arranging photoelectric converters in a line. A carriage 3 mounting a reading unit is supported by support member such as shaft and rail not shown in the diagram, and its moving direction is defined in the lateral direction in the diagram. Power generated by a drive source 4 is transmitted to a driving pulley 5 through a timing belt 6. A belt 7 is stretched between the driving pulley 5 and a driven pulley 8, and depending on the rotation of the driving pulley 5, the carriage 3 is moved in direction d1 or its reverse direction. The image of an original 9 on an original platen 2 is read line by line along with move of the carriage 3.

When the power source of the apparatus is turned on, the carriage 3, wherever located, returns to home position po1, and an aperture 14 moves to a reference acquisition, position 112 immediately beneath a white reference panel. Lighting up a lamp 13, an image sensor 16 reads the white reference panel, and depending on the analog signal output, the amplification factor is determined, or the black and white levels are adjusted. Then the lamp 13 is put off, an the carriage 3 returns to home position po1 to be in waiting state.

Figure 2:
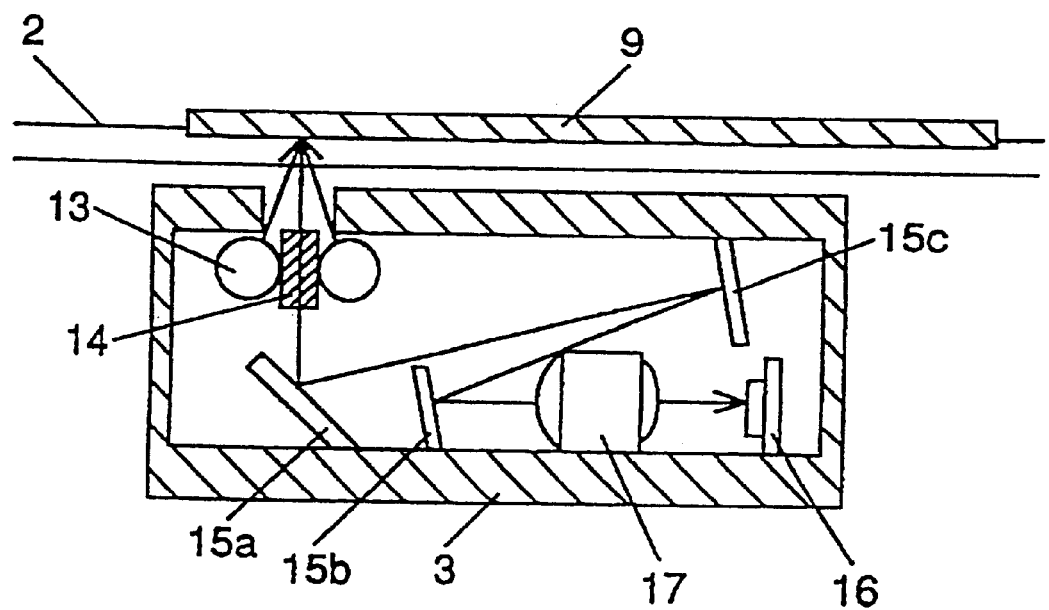
FIG. 2 is a sectional view showing an internal structure of a carriage in a conventional image reading apparatus.

Consequently, from the host system such as personal computer (PC, not shown), after setting the reading resolution, reading range, etc., when an original reading command is issued, the reading apparatus lights up the lamp 13 in the carriage in FIG. 2 and rotates the drive source 4, and moves the carriage 3 in direction d1 through the timing belt 6, driving pulley 6, belt 7 and driven pulley 8. Just before the carriage 3 reaches the beginning of the region corresponding to the reading range set from the PC, the driving speed is changed to the speed corresponding to the reading resolution preset from the PC, and reading of the original placed on the original platen 2 is started. The original 9 is illuminated by the lamp 13 through the original platen 2, and the reflected light from the original is reflected by reflecting mirrors 15a, 15b, 15c, and is reduced and focused on the image sensor 16 by a focusing lens 17, and converted into an electric signal by the image sensor 16 and is transferred to the PC. When reading of the specified reading range is over, the lamp 13 is put off, and the carriage 3 is moved in the reverse direction of direction d1, and returns to home position po1, and a series of reading operation is terminated.

Exemplary Embodiments

Exemplary embodiments of the invention are described below while referring to FIG. 1 through FIG. 21.

Figure 3:
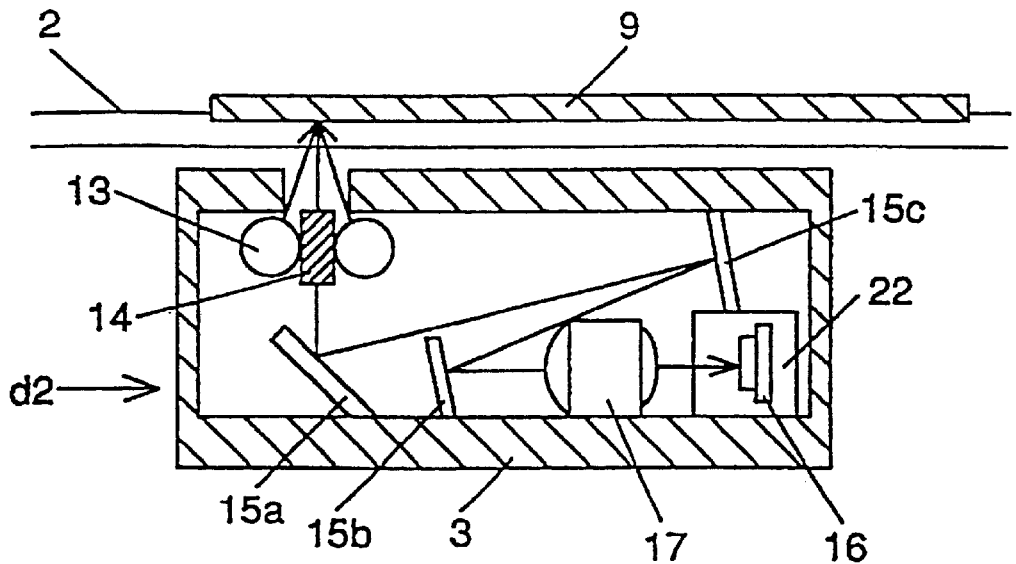
FIG. 3 is a sectional view showing an internal structure of a carriage in an image reading apparatus of the invention.

FIG. 3 is a sectional view showing an internal structure of a carriage in an embodiment of the invention, in which a sensor displacement unit 22 for holding the image sensor 16 and moving slightly (displacing) the image sensor 16 in its line direction at a specified amplitude and a specified frequency is added to the general internal structure of the carriage shown in FIG. 2.

Figure 4:
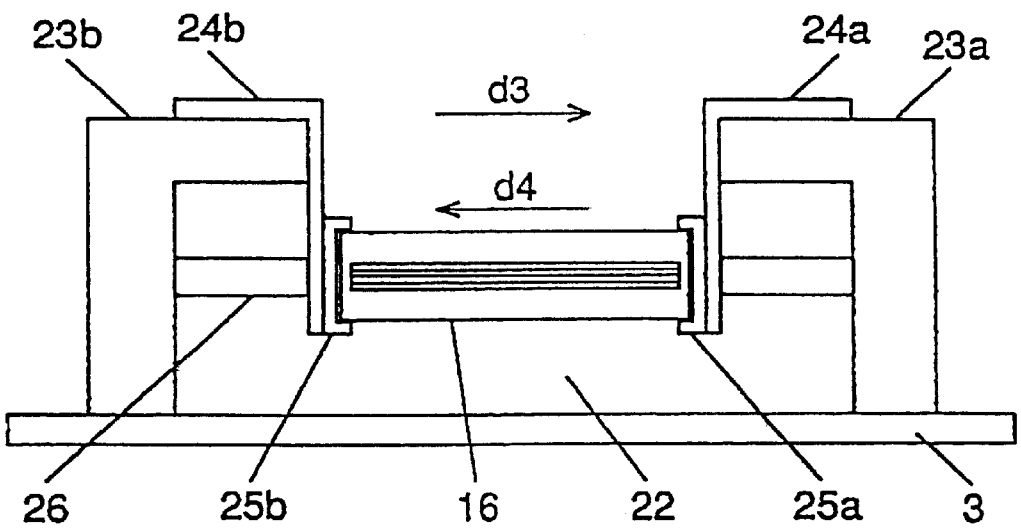
FIG. 4 is a structural diagram showing a detailed constitution of a sensor displacement unit.

FIG. 4 is a structural diagram of the sensor displacement unit 22 as seen from direction d2 shown in FIG. 3. Holding members 23a, 23b are fixed to the base bottom of the carriage 3, and plates 24a, 24b composed of plate springs are fixed to the holding members 23a, 23b, respectively at the upper positions. Support members 25a, 25b support the image sensor 16. By feeding a specified signal to an actuator 26 of laminated piezoelectric element, the image sensor 16 moves in direction d3 or d4.

Figure 5:
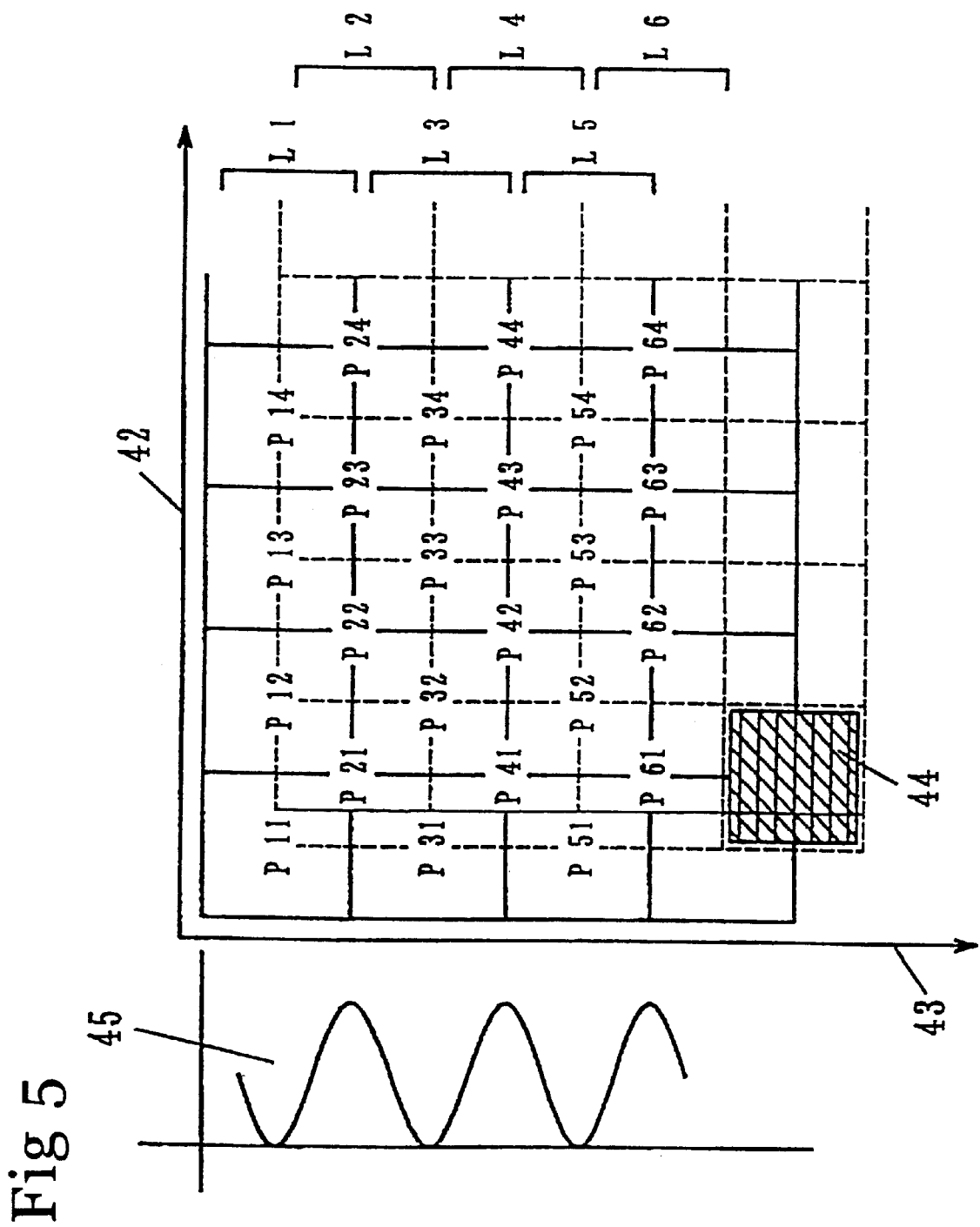
FIG. 5 is a data map showing a pixel layout when reading an image while displacing.

Referring next to FIG. 5, the layout of image data obtained by displacing the image sensor 16 reciprocally in the line direction is explained below. FIG. 5 shows the pixel layout in the case of reading the image while displacing. In FIG. 5, reference numeral 42 is a main scanning direction which is the array direction of photoelectric converters of the image sensor 16, and 43 is a sub-scanning direction of the carriage 3 containing the sensor moving in order to read. In the following description of interpolation of pixels and others, the main scanning direction 42 is referred as the horizontal direction, and the sub-scanning direction 43 is referred as the vertical direction. Reference numeral 44 refers to the size of one pixel determined mainly by the precision of the lens, and 45 represents the displacement amount of the image sensor 16 in the main scanning direction 42 along with the move of the carriage 3 in the direction 43.

Besides, L1, L2, L3, . . . , Li, . . . , Ln are reading lines 1, 2, 3, . . . , i, . . . n (n is the maximum value of reading lines), and the magnitude of the reading pixel in the vertical direction, that is, the height is shown together in the diagram. For example, Pij is the symbol of the j-th pixel (j=1, 2, 3, . . . , m; m being the maximum value of the reading pixels in the horizontal direction) from the left end of i-th line. That is, P11, P12, P13, P14, . . . are symbols of first, second, third, fourth, . . . reading pixels on the reading line L1; P21, P22, P23, P24, . . . are symbols of first, second, third, fourth, . . . reading pixels on the reading line L2; and P61, P62, P63, P64, . . . are symbols of first, second, third, fourth, . . . reading pixels on the reading line L6.

The line interval of the pixels to be read is half of the interval of the pixels in the horizontal direction. Further, as shown in the displacement state 45, since the pixels are being read by moving ½ each in the horizontal direction in every effective line, the pixels included in the even-number reading lines L2, L4, are read as being deviated rightward in the horizontal direction by ½ of the pixel interval as compared with the pixels included in the odd-number reading lines L1, L3,

Outline of Interpolating Method

Figure 6:
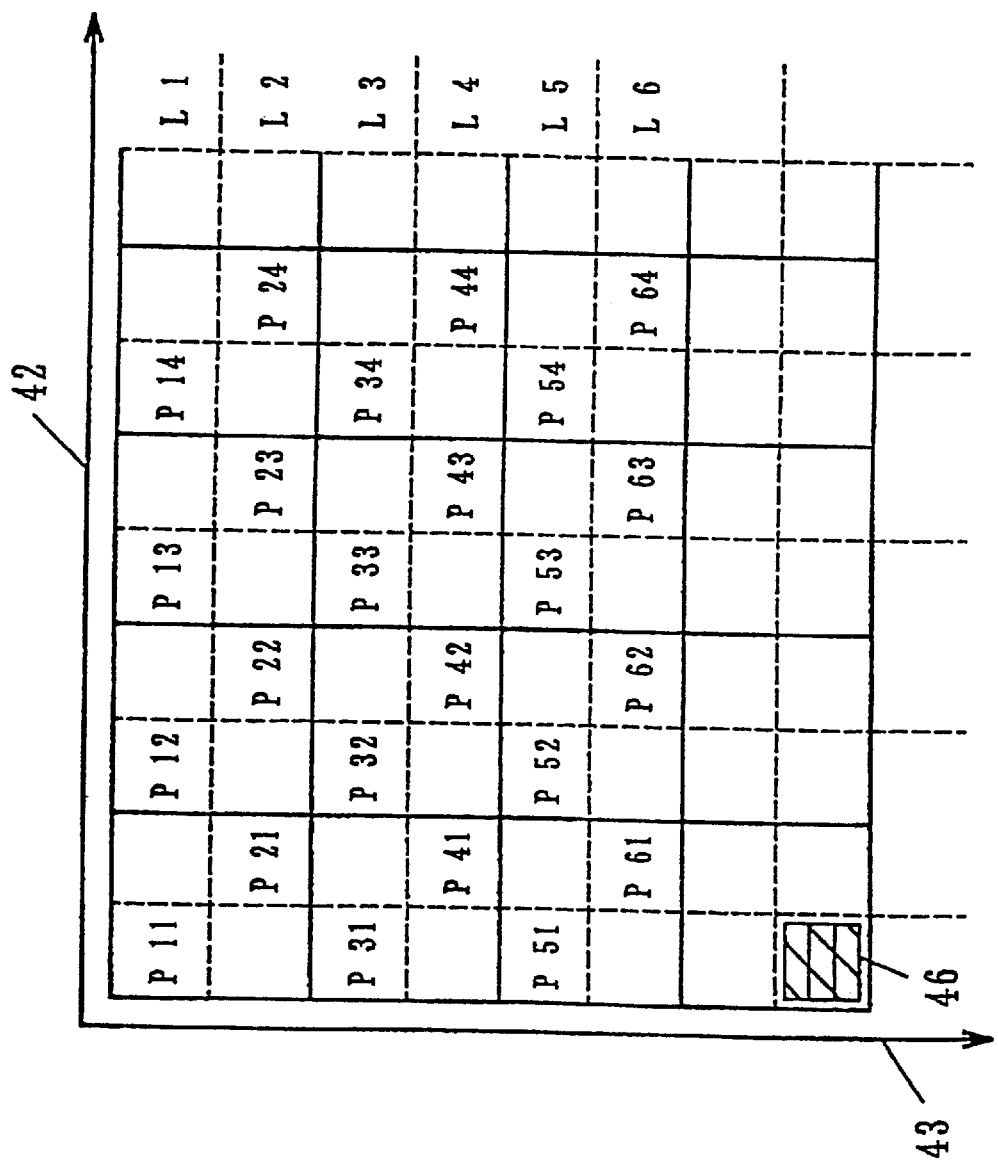
FIG. 6 is a data map showing configuration of pixels when replaced with a mesh of double density of the pixel interval in FIG. 5.

Referring to FIG. 5, FIG. 6, FIG. 7 and FIG. 8, an outline of pixel interpolation process is described. FIG. 6 is a data map showing the placement of the read-in pixel Pij on a mesh of double density of the pixel pitch which replaces a mesh in FIG. 5, in both horizontal direction and sub-scanning direction, showing a checkered pattern. Reference numeral 46 shows the size of one pixel when interpolating the read pixels in the following process. This size 46 of one pixel is about ¼ in area when compared with the size 44 of one pixel in FIG. 5.

First is described about the method of interpolating the pixels at the inside of the upper, lower, right and left borders, in the pixels of the interval of pixels being read in checkered pattern.

Pixels Xij to be interpolated are first assigned as shown in FIG. 7. That is, same as ij in Pij, i denotes the line number and j represents the number from the left end in the horizontal direction. When interpolation is processed sequentially from top to bottom, all of X (i−1)j(j=1, m) on the upper line of the pixel Xij to be interpolated are already interpolated and its values are determined.

Meanwhile, the pixels to be interpolated later are called interpolating pixels. As shown in FIG. 8, an interpolating pixel Xij is expressed by Xc, the upper, lower, left and right directions are represented by north, south, west and east, and the symbols of the adjacent pixels being read are expressed as Pn, Ps, Pw, Pe, and upper left and upper right interpolated pixel symbols are expressed as Xnw and Xne, respectively. The pixel data value (or called pixel value) is expressed by the same symbol as the pixel symbol.

Interpolating Method 1

A first example of interpolating method is described below

To begin with, from the pixel values of the east-west set and north-south set adjacent to the interpolating pixel Xc, interpolation candidate values Awe and Ans are determined.

$Awe=(Pw+Pe)/2$ $Ans=(Pn+Ps)/2$

Next, differential values Dwe and Dns of pixels values of same set are determined.

$Dwe=|Pw-Pe|$ $Dns=|Pn-Ps|$

By the magnitude relation of Dwe and Dns, the interpolation values are selected as follows:

If $Dwe<Dns$, then $Xc=Awe$, or

If $Dwe \geq Dns$, then $Xc=Ans$.

In this way, for example, when the edge is continuous in the east-west direction Pw→Xc→Pe, the pixel values on the edge line do not vary significantly, and there is only a slight difference between the values of Pw and Pe, and the average Awe of Pw and Pe is selected as the interpolating value of Xc, so that the pixel values are continuous at the edge. In one of conventional methods of interpolation by the average of four pixel values, generally, the pixel values at edge are discontinuous, and the edge line is made blurry by interpolations.

In other words, extracting a set of two pixels adjacent in the east-west direction and a set of two pixels adjacent in the north-south direction out of interpolating pixels, by using the set of smaller difference in pixel values in each set, the pixel value of the interpolating pixel position is determined. By making use of the characteristic that the difference of pixel values adjacent to the interpolating pixel is small in the edge continuous direction, and that the difference of pixel values adjacent to the interpolating pixel is large in the direction orthogonal to the edge, interpolation suited to the edge direction is executed effectively. As a result deterioration of the edge portion may be suppressed to a minimum limit. Hence, the edge portion is reproduced very smoothly.

Or, in the portion of half tone image smoothly changing in all pixel values, th difference in the east-west direction and the difference in the north-south direction of pixel values adjacent to the interpolating pixel are similar values, and if interpolated by either interpolation candidate value, the continuity of concentration of the half tone image is not spoiled largely but is maintained.

Interpolating Method 2

A second example is expansion of the first method in the edge in the diagonal direction.

The following six candidate values are determined by each combination of adjacent four pixels to the interpolating pixel Xc.

$Awe=(Pw+Pe)/2$ $Ans=(Pn+Ps)/2$ $Ane=(Pn+Pe)/2$ $Anw=(Pn+Pw)/2$ $Asw=(Ps+Pw)/2$ $Ase=(Ps+Pe)/2$

Then, by each combination of adjacent four pixels to the interpolating pixel Xc, each difference is determined.

$Dwe=|Pw-Pe|$ $Dns=|Pn-Ps|$ $Dne=|Pn-Pe|$ $$Dnw=|Pn-Pw|$$

$$Dsw=|Ps-Pw|$$

$$Dse=|Ps-Pe|$$

That is, Dwe the difference in the east-west direction, Dns is the difference in the north-south direction, Dne and Dsw are both differences from the northwest to the southeast direction, and Dnw and Dse are both differences from the northeast to the southwest direction.

The minimum value is determined from the six differences of Dwe to Dse. When the Dwe is the minimum value, the edge is directed in the east-west direction, hence $$Xc=Awe;$$

when the Dns is the minimum value, the edge is directed in the north-south direction, hence $$Xc=Ans.$$

When the Dne is the minimum value and Dsw is the next smallest value, or, to the contrary, when the Dsw is the minimum value and Dne is the next smallest value, the edge is directed from the northwest to the southeast direction. Therefore, as the interpolating value of Xc, of the two values Ane and Asw of candidates of interpolating values in this direction, the one closer to the interpolated pixel value Xnw of the northwest direction; is selected.

Similarly, when the Dnw is the minimum value and Dse is the next smallest value, or, to the contrary, when the Dse is the minimum value and Dnw is the next smallest value, the edge is directed from the northeast to the southwest direction. Therefore, as the interpolating value of Xc, of the two values Anw and Ase of candidates of interpolating values in this direction, the one closer to the interpolated pixel value Xne of the northeast direction is selected.

In other cases, it may be processed by regarding as part of the plane rather than part of the edge, and the interpolating value is Ane when the minimum difference is Dne, Anw if Dnw, Asw if Dsw, or Ase if Dse. In this case only, the average of four pixels used in the conventional method may be selected as the interpolating value of Xc.

Figure 9:
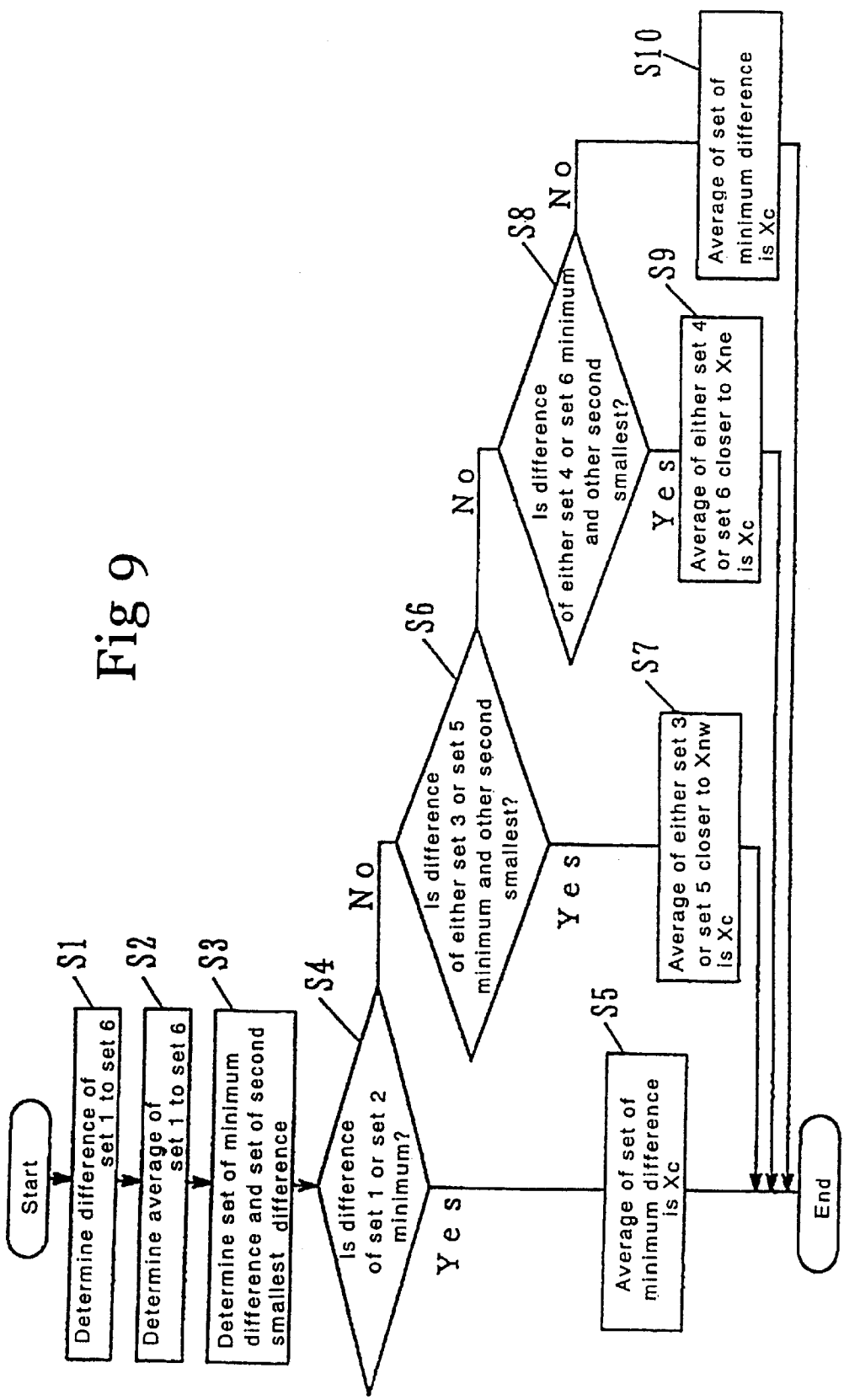
FIG. 9 is a flow chart of pixel interpolating method 2.

This method is shown in a flowchart in FIG. 9. In the flowchart, pixel sets 1 to 6 are (Pw, Pe), (Pn, Ps), (Pn, Pe), (Pn, Pw), (Ps, Pw), and (Ps, Fe).

Referring now to FIG. 10, about the interpolating method in the diagonal directions of the east-west and north-south directions mentioned above, that is, from the northwest to the southeast direction and from the northeast to the southwest direction, the basic principle is described in detail below. FIG. 10(a) to (d) are data diagrams showing the edge state, in which the dark portion denotes the object edge or its inside (low luminosity portion), and the white portion shows the object outside (high luminosity portion).

Figure 10A:
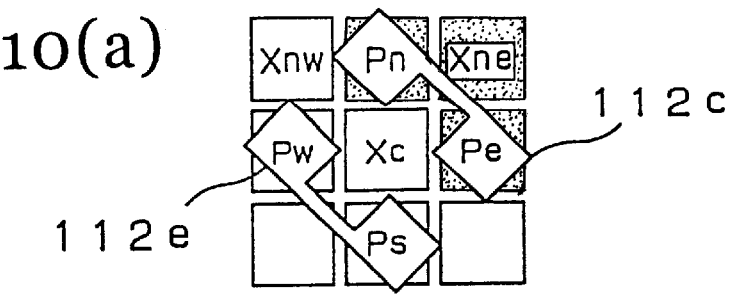
FIGS. 10(a), (b) are data diagrams showing the state of the edge crossing from the northwest to the southeast direction.

In FIG. 10(a) the object edge is present in Pn→Pe, and at this time the difference Dne of the set 3 (112c) and the difference Dsw of the set 5 (112e) are smaller than those of other sets. This is because the other sets all straddle over the inside and outside of the edge, and reflect the luminosity difference between edge inside and outside. The interpolating pixel position Xc is outside of the object, and is preferred to be interpolated at the value expressing a high luminosity. However, when interpolated by the average of the set of the minimum difference, either candidate value of the average Ane of set 3 (112c) or the average Asw of set 5 (112e) is adopted, and it is possible to be interpolated to the value of low luminosity. Therefore, from both candidate values, by selecting the one closer to the value Xnw of the interpolated pixel at the northwest position of the interpolating pixel Xc as the value of the interpolating pixel Xc, the state of the edge can be expressed accurately.

Figure 10B:
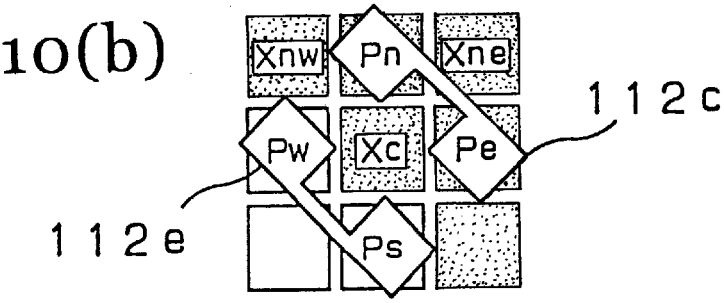
FIGS. 10(c), (d) are data diagrams showing the state of the edge crossing from the northeast to the southwest direction.

In FIG. 10(b), although the object edge is present in Xnw Xc, by the same reason as mentioned above, the difference Dne o the set 3 (112c) and the difference Dsw of the set 5 (112e) are at least smaller than those of other sets securely. The interpolating pixel position Xc is inside of the object, and is preferred to be interpolated at the value expressing a low luminosity, and same as in the case above, by determining the value Xc of the interpolating pixel by referring to the interpolated pixel Xnw at the northwest pixel position of the interpolating pixel Xc, the state of the edge can be expressed accurately.

Figure 10C:
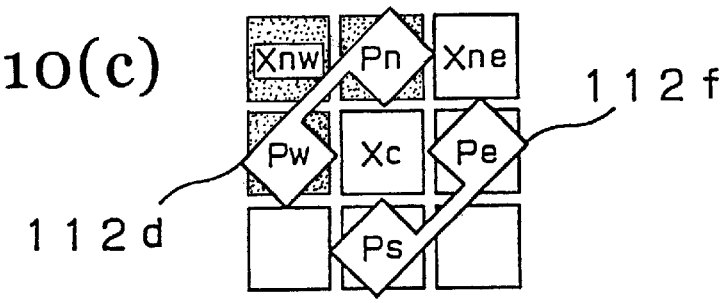

In FIG. 10(c) although the object edge is present in Pn→Pw, by the same reason as mentioned above, the difference Dnw of the set 4 (112d) and the difference Dse of the set 6 (112f) are at least smaller than those of other sets securely. The interpolating pixel Xc is outside of the object, and is preferred to be interpolated at the value expressing a high luminosity. However, when interpolated by the average of the set of the minimum difference, either candidate value of the average Anw of set 4 (112d) or the average Ase of (112f) is adopted, and it is possible to be interpolated to the value of low luminosity. Therefore, from both candidate values, by selecting the one closer to the value Xne of the interpolated pixel the northeast position of the interpolating pixel Xc as the value of the interpolating pixel Xc, the state of the edge can be expressed accurately.

Figure 10D:
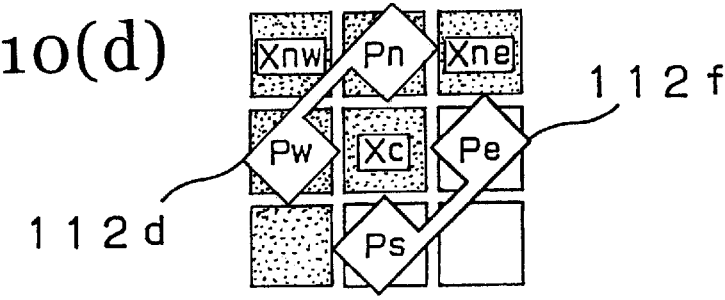

In FIG. 10(d), although the object edge is present in Xne→Xc, by the same reason as mentioned above, the difference Dnw of the set 4 (112d) and the difference Dse of the set 6 (112f) are at least smaller than those of other sets securely. The interpolating pixel position Xc is inside of the object, and is preferred to be interpolated at the value expressing a low luminosity, and same as in the case above, by determining the value Xc of the interpolating pixel position by referring to the interpolated pixel Xne at the northeast pixel position of the interpolating pixel position, the state of the edge can be expressed accurately.

In all cases of FIG. 10, if the inside of the object expressed in the dark portion and the outside of the object expressed in the white portion are exchanged, the pixel values can be similarly interpolated as apparent from the description above.

Thus, interpolation is performed by using plural sets of two pixels adjacent in the diagonal direction, in addition to sets of two pixels adjacent in the east-west direction and sets of two pixels adjacent in the north-south direction, relating to the interpolating pixel position. Therefore, in this method of interpolation, all edge portions in two diagonal directions can be interpolated correctly together with the image edge portions in the east-west direction and north-south direction. Moreover, relating to the extracted plural sets, by selecting the specified number of sets from the smallest difference in the pixel values, the pixel value at the interpolating pixel position is determined according to the pixel values of the selected sets and the value of the pixels interpolated in the past, and therefore if the edge is continuous in the diagonal direction, the continuity of edge can be securely maintained by suppressing random undulations in the edge portion due to slight difference in the pixel values.

Interpolating Method 3

A third interpolating method is described below.

Same as before, the interpolating pixel is Xc, and symbols of adjacent pixels in FIG. 11 are used in the following description. The thick line in the diagram is the prediction window of the following interpolating pixel Xc.

First, predicted value αc1 of pixel Xc is determined from the read pixel data. The prediction window including the interpolating pixel comprises read pixel values Pn and Pw. Supposing both pixel values to be representative values of the, window, the sum of the four pixel values in the window is expressed as $$Xnw+Pn+Pw+\alpha c1=(Pn+Pw)\times 2$$

Of these pixel values, values of Pn, Pw, and Xnw are known, and the predicted value αc1 of Xc is $$\alpha c1=Pn+Pw-Xnw$$

This method of prediction is same as the technique of DPCM (differential pulse code modulation) used, for example, in video compression and audio compression technique.

On the other hand, pixel values of interpolation candidates of the interpolating Xc are calculated in three methods. The first is to determine plural interpolation candidate values of averages Awe, Anw of two sets of two pixels adjacent in the east-west direction and north-south direction of the interpolating pixel Xc, and average Axy of four pixels adjacent in the east-west and north-south direction of the interpolating pixel position Xc.

$$Awe=(Pw+Pe)/2$$
$$Ans=(Pn+Ps)/2$$
$$Axy=(Pn+Pw+Pe+Ps)/4$$
$$=(Awe+Ans)/2$$

Next, comparing the predicted value αc1 and candidate values Awe, Ans, Axy, the candidate value of the smallest difference is obtained as the interpolating pixel value.

In this way, plural interpolating candidate values are calculated from the adjacent pixel values to the interpolating pixel, and the predicted value of the interpolating pixel is determined from these pixel values of adjacent pixels and already interpolated pixel value, and one candidate value closest to the predicted value is selected from these candidate values, and the interpolating pixel value is obtained.

Thus, the edge component can be predicted, and deterioration of edge component may be suppressed to a minimum limit. For example, if an edge continuous in the north-south direction is present in the reading image, in the conventional interpolation by simple average, the edge information is evidently blunt, but by using the algorithm described in this embodiment the edge information is completely maintained. Hence, the edge is reproduced very smoothly. The same holds true in the edge continuous in the east-west direction, and in the portion of half tone image in which all pixel values change smoothly, since the average of four adjacent pixels to the interpolating position is selected, the half tone image is reproduced more smoothly.

Interpolating Method 4

A fourth interpolating method is described below.

Same as before, the interpolating pixel is Xc, and symbols of adjacent pixels in FIG. 12 are used in the following description. The thick line in the diagram is the prediction window of the following interpolating pixel Xc.

First, predicted values αc1, αc2 of pixel Xc are determined from the read pixel data. The window including the interpolating pixel comprises Pn, Pw and Pe as read image data. Suppose, of these three pixel values, Pn and Pw to be first representative values of the window, and Pn and Pe to be second representative values of the window. The predicted value αc1 of Xc on the basis of the first representative value is $$\alpha c1=Pn+Pw-Xnw$$

according to the algorithm shown in interpolating method 3, and the predicted value αc2 using the second representative values is $$\alpha c2=Pn+Pe-Xne$$

This method of prediction is same as the technique of DPCM (differential pulse code modulation) used, for example, in video compression and audio compression technique.

On the other hand, pixel values of interpolation candidates of the interpolating pixel Xc are calculated in five methods. The first is to determine plural interpolation candidate values of averages Awe, Anw of two sets of two pixels adjacent in the east west direction and north-south direction of the interpolating pixel Xc, average Axy of four pixels adjacent in the east-west and north-south direction of the interpolating pixel Xc, average Anw of two pixels laid parallel in the northeast and southwest direction adjacent to the interpolating pixel Xc, and average Ane of two pixels laid parallel in the northwest and southeast direction adjacent to the interpolating pixel Xc.

$$Awe=(Pw+Pe)/2$$
$$Ans=(Pn+Ps)/2$$
$$Axy=(Pn+Pw+Pe+Ps)/4$$
$$=(Awe+Ans)/2$$
$$Anw=(Pn+Pw)/2$$
$$Ane=(Pn+Pe)/2$$

Next, finding the difference between each of the predicted values αc1 and αc2, and the candidate values Awe, Ans, Axy, Anw, Ane, the candidate value of the smallest difference is selected as the pixel value of the interpolating pixel Xc.

In this way as a result of calculating plural predicted values and plural interpolating candidate values and selecting the candidate value of the smallest different from the plural predicted values, in, the case of an image having a continuous edge in the diagonal direction or an image having a half tone portion distributed widely around the edge, the edge can be reproduced more clearly compared with interpolating method 3.

Interpolating Method of Border Element

When the interpolating method mentioned above is applied in interpolation of a pixel existing on a border of image plane, the value of the pixel existing outside of the plane is needed, and hence it cannot be applied directly. Therefore, a pixel existing on a border is interpolated by two pixels adjacent along the border. Symbols in FIG. 7 are used herein.

A first line of a border in the horizontal direction is interpolated as $$X1j=(P1j+P1(j+))/2$$

a final line n is interpolated as $$Xnj=(Pnj+Pnr(j+1))/2$$

if the line is an odd umber line, that is, if n is an odd number, or as $$Xnj=(Pn(j-1)+Pnj)/2$$

if n is an even number.

On a border in the vertical direction, a first pixel of a border at the left end is $$Xi1=(P(i-1)1+P(i+1)1)/2$$

if i is an even-number pixel, and an m-th pixel of a border at the right end (2m-th pixel if including the interpolating pixel) is interpolated as $$Xim=(P(i-1)m+P(i+1)m)/2$$

if i is an odd-number pixel.

Selecting Method of Interpolation Candidate Value when Reading Color Image

In the foregoing description, the image data to be read by the image reading apparatus composes one plane, but in the image reading apparatus for reading color image, color planes are composed of at least three primary color image data, for example red (R), green (G), and blue (B). Each plane can be interpolated independently, but the edge information of visual characteristic mainly depends on the luminosity information of image, and it is preferred to interpolate the pixel according to the luminosity information.

Expressing reading pixel values of red (R), green (G), and blue (B) respectively as $P_Rij$, $P_Gij$, $P_Bij$, pixel values at interpolating positions as $X_Rij$, $X_Gij$, $X_Bij$, and the pixel value representing the luminosity as Pij, the following relation is approximately established.

$$Pij=0.30\times P_Rij+0.59\times P_Gij+0.11\times P_Bij$$

Herein, the coefficient of each color pixel value differs naturally with the spectral distribution of lighting and each primary color.

Similarly, the pixel value Xij representing the luminosity of the interpolating position is expressed as $$Xij=0.30\times X_Rij+0.59\times X_Gij+0.11\times X_Bij$$

Therefore, using the reading pixel value Pij and interpolated pixel value Xij obtained by multiplying pixel value of each primary color by its coefficient and summing up, the aforesaid interpolating method is applied. Selecting the candidate value in each interpolating pixel, and depending on the result of selection, the pixel is interpolated by selecting the candidate value of same kind in each primary color plane. For example, when Awe is selected as the interpolating pixel value Xc for luminosity, $A_R$we, $A_G$we, $A_B$we are selected as the interpolating pixel values of primary colors $X_R$c, $X_G$c, $X_B$c, and each primary color plane is interpolated. As a result, it is possible to interpolate accurately according to the edge information for visual characteristic.

As understood from the formula of relation of the luminosity, since the pixel value of green primary color has a great contribution to the luminosity information, the candidate value is selected on the green lane, and by selecting the candidate value of the same kind in each primary color plane and interpolating the pixel according to the result of selection, it is possible to process similarly to the luminosity information processing. And the circuit configurations is simpe compared with the luminosity information processing.

Herein, examples of selection of interpolation candidate value on the green plane using interpolating method 1 and interpolating method 3 are described in detail. Symbols corresponding to primary color planes are expressed by suffixing with R, G, B same as in the case of pixel values X and P.

Figure 13:
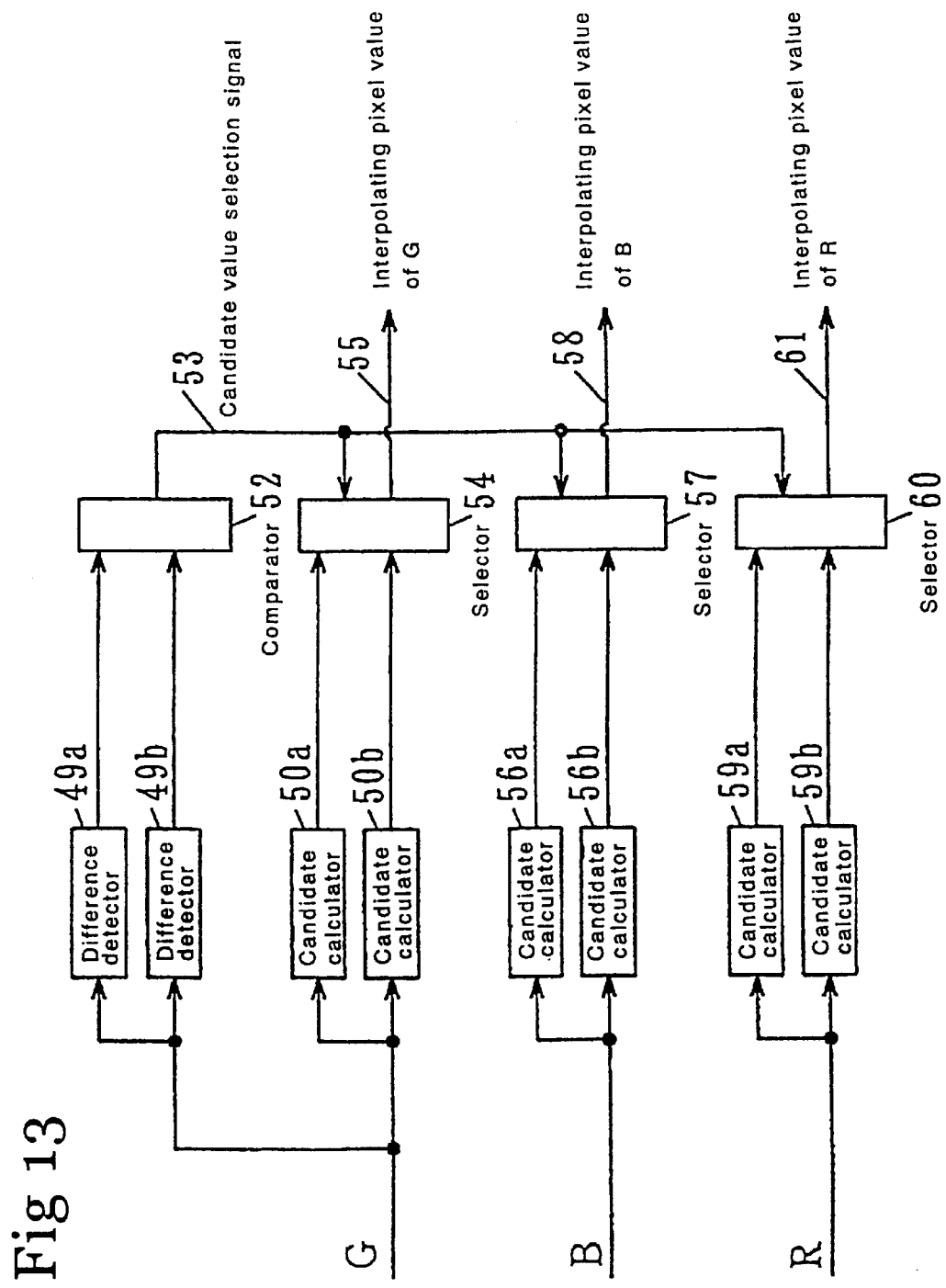
FIG. 13 is a block diagram of pixel interpolating method 1 by selection of interpolation candidate values on G plane.

Referring first to a block diagram in FIG. 13, a case of using interpolating method 1 is explained.

Let us begin with processing of pixel value of green plane. A difference detector 49a detects difference $Dwe_G$ of values of two pixels adjacent in the east-west direction of interpolating pixel $X_G$c, whereas a difference detector 49b detects difference $Dns_G$ of values of two pixels adjacent in the north-south direction of interpolating pixel. A candidate calculator 50a calculates average $Awe_G$ of values of two pixels adjacent in the east-west direction of interpolating pixel position, whereas a candidate calculator 50b calculates average $Ans_G$ of values of two pixels adjacent in the north-south direction of interpolating pixel position. A comparator 52 compares the outputs from the difference detector 49a and difference detector 49b, and, if $Dwe_g<Dns_G$, changes a candidate value selection signal 53 from OFF to ON. The candidate value selection signal 53 is fed into a selector 54, and the selector 54 selects the output $Awe_G$ of the candidate calculator 50a when the candidate value selection signal 53 is ON, and selects the output $Ans_G$ of the candidate calculator 50b when OFF. The output of the selector 54 is the interpolating pixel value 55 $X_G$c of the green plane.

Processing of blue plane is described. A candidate calculator 56a calculates average $Awe_B$ of values of two pixels adjacent in the east west direction of interpolating pixel position, whereas a candidate calculator 56b calculates average $Ans_B$ of values of two pixels adjacent in the north-south direction of interpolating pixel position. The candidate value selection signal 53 obtained from the green plane is also fed into a selector 57, and the selector 57 selects the output $Awe_B$ of the candidate calculator 56a when the candidate value selection signal 53 is ON, and selects the output $Ans_B$ of the candidate calculator 56b when OFF. The output of the selector 57 is the interpolating pixel value 58 $X_B$c of the blue plane.

Similarly, processing of red plane is described. Same as in the blue plane, a candidate calculator 59a calculates $Awe_R$, and a candidate calculator 59b calculates $Ans_R$. A selector 60 selects the output $Awe_R$ of the candidate calculator 59a when the candidate selection signal is ON, and selects the output $Ans_R$ of the candidate calculator 59b when OFF. The output of the selector 60 is the interpolating pixel value 61 $X_R$c of the red plane.

Figure 14:
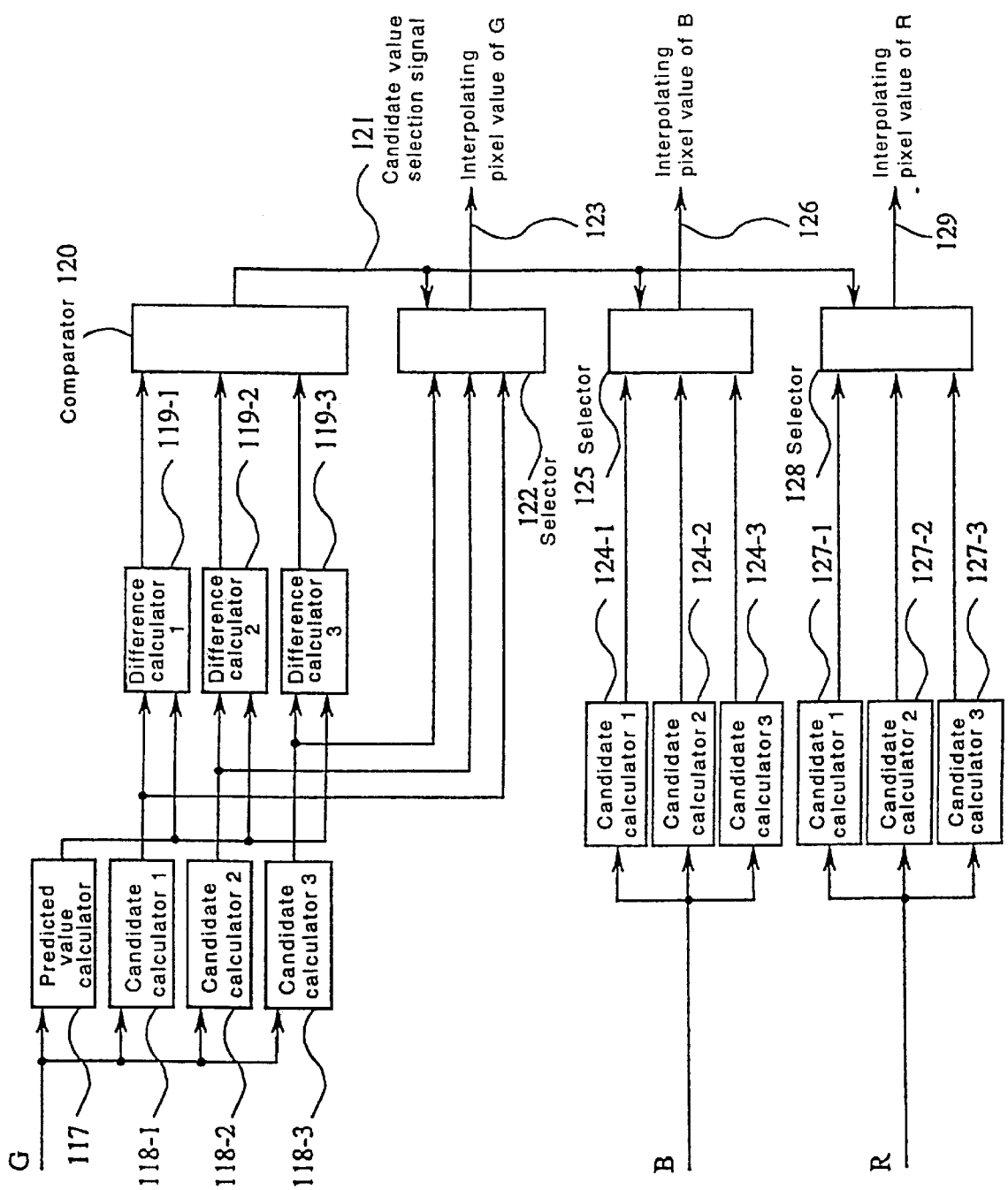
FIG. 14 is a block diagram of pixel interpolating method 3 by selection of interpolation candidate values on G plane.

Referring next to a block diagram in FIG. 14, a case of using interpolating method 3 is explained.

Let us begin with processing of pixel value of green plane. A predicted value calculator 117 determines predicted value $\alpha c1_G$ of the interpolating pixel, about the image data of the green plane, by referring to the surrounding pixel values of interpolating pixel $X_G$c and already interpolated pixel values. A candidate calculator 1 (118-1) calculates average $Awe_G$ of two pixels adjacent in the east-west direction of interpolating pixel. A candidate calculator 2 (118-2) calculates average $Ans_G$ of two pixels adjacent in the north-south direction of interpolating pixel. A candidate calculator 3 (118-3) calculates average $Axy_G$ of four pixels adjacent in four directions of north, south, east and west of the interpolating pixel. A difference calculator 1 (119-1) calculates difference between the predicted value $\alpha c1_G$ as the output from the predicted value calculator 117 and the candidate value $Awe_G$ as the output from the candidate calculator 1 (118-1). Similarly, a difference calculator 2 (119-2) calculates difference between the predicted value $\alpha c1_G$ and the candidate value $Ay1_G$, and a difference calculator 3 (119-3) calculates difference between the predicted value $\alpha p1_G$ and the candidate value $Axy_G$. A comparator 120 selects the smallest value of the outputs from the difference calculator 1, difference calculator 2 and difference calculator 3, and issues a candidate selection signal 121, and feeds it into a selector 122. The selector 122, according to the candidate value selection signal 121, selects and issues one of candidate values $Awe_G$, $Ans_G$, $Axy_G$ issued from the candidate calculator 1 (118-1), candidate calculator 2 (118-2) and candidate calculator 3 (118-3). The output of the selector 122 is the interpolating pixel value 123 $X_Gc$ of the green plane. That is, the candidate value of the smallest difference from the predicted value $\alpha c1_G$ is issued.

Processing of blue plane is described. A candidate calculator 1 (124-1) calculates average $Awe_B$ of two pixels adjacent in the east-west direction of interpolating pixel, a candidate calculator 2 (124-2) calculates average $Ans_B$ of two pixels adjacent in the north-south direction of interpolating pixel, and a candidate calculator 3 (124-31) calculates average $Axy_B$ of four pixels adjacent in four directions of north, south, east and west of the interpolating pixel. According to the candidate value selection signal 121 obtained in the green plane, a selector 125 selects the output of the same candidate calculator number as the output on the green plane from the candidate calculator 1 (124-1), candidates calculator 2 (124-2) and candidate calculator 3 (124-3). The output of the selector 125 is the interpolating pixel value 126 $X_Bc$ of the blue plane.

Processing of red plane is same as processing of blue plane. A candidate calculator 1 (127-1) calculates average $Awe_R$ of two pixels adjacent in the east-west direction of interpolating pixel, a candidate calculator 2 (127-2) calculates average $Ans_R$ of two pixels adjacent in the north south direction of interpolating pixel, and a candidate calculator 3 (127-3) calculates average $Axy_R$ of four pixels adjacent in four directions of north, south, east and west of the interpolating pixel. A selector 128, according to the candidate value selection signal 121, selects the output of the same candidate calculator number as the output on the green plane from the candidate calculator 1 (127-1), candidate calculator 2 (127-2) and candidate calculator (127-3). The output of the selector 128 is the interpolating pixel value 129 $X_Rc$ of the red plane.

So far, as examples of selection of interpolation candidate values on the green plane, interpolating method 1 and interpolating method 3 are explained, but other interpolating methods may be similarly applied. The luminosity mainly responsible for edge information of visual characteristic is closely correlated with the green plane, and the edge information of full color image is maintained almost completely, and the image can be interpolated accurately. Further, if the registration of R, G, B colors of the image reading apparatus is slightly deviated, and color deviation should occur in the output image, it is effective, to reproduce the edge portion of black characters, in particular, with less color blurring. Still more, in the block diagram explained above, the hardware configuration may be significantly simplified as compared with the case of predicting the pixel values of each primary color independently.

Incidentally, when the input to the comparator 52 or 120 in the two block diagrams presented above is produced from the luminosity information, although the hardware scale is slightly increase, the edge information of the visual characteristic may be processed more accurately.

Pixel Reading Method

So far, assuming that the pixel plane being read out from the original image is a checkerd pattern, the method of interpolating the interval of these pixels without losing edge; information is described. The method of obtaining a checkered pixel plane of the reading image as the preliminary condition is explained below.

Figure 15:
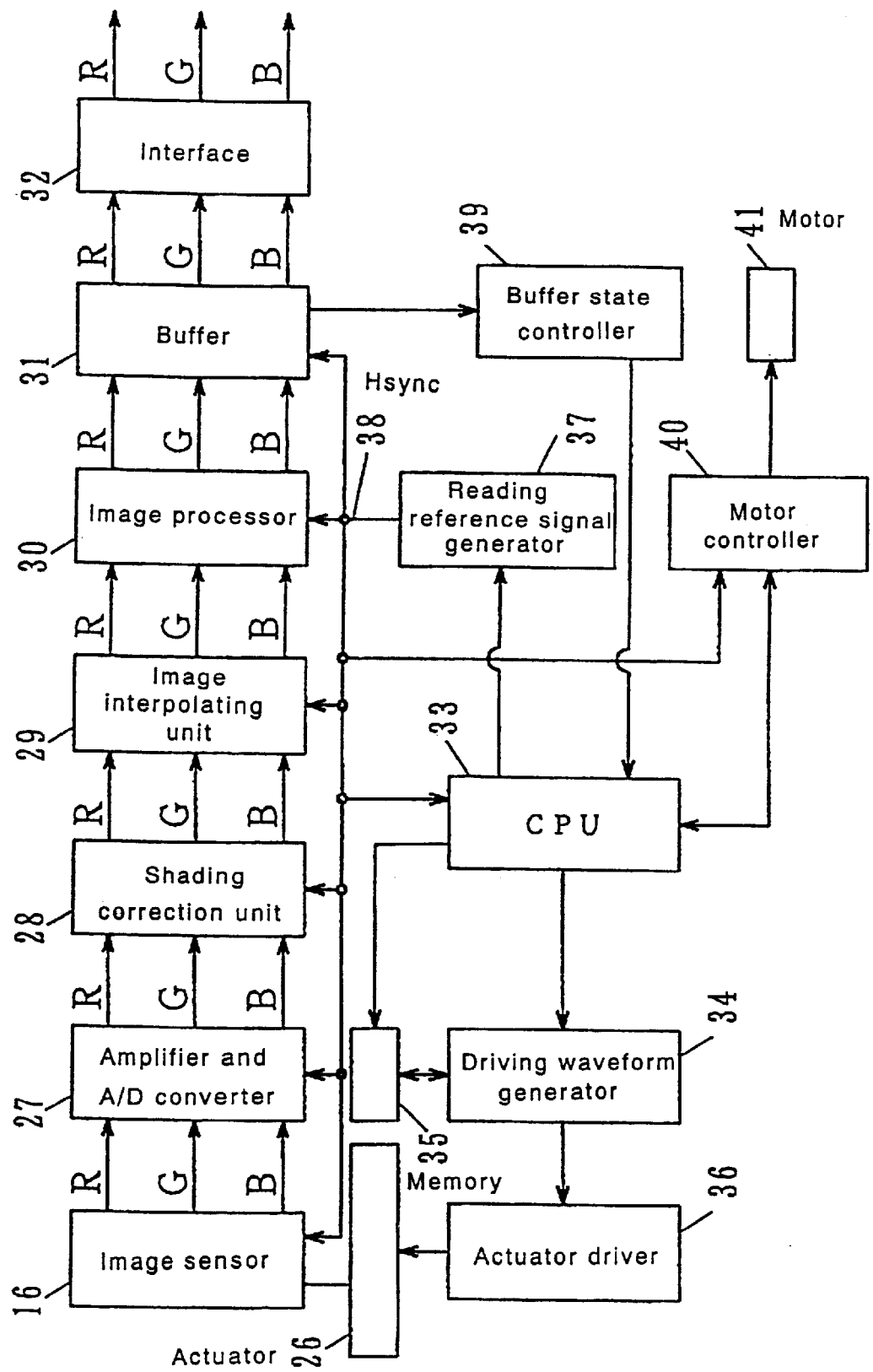
FIG. 15 is a block diagram showing an electrical system of an image reading apparatus of the invention.

In FIG. 15, the function and operation of the electrical system of the image reading apparatus are described.

Red, green and blue analog video signals R, G, B from an image sensor 16 are amplified and converted in an amplifier and A/D converter 27, into digital video data R, G, B. Each digital video data is normalized between white and black levels in 1a shading correction unit 28, and interpolated in a pixel interpolating unit 29 (in the method mentioned above), and converted from low resolution video data into high resolution video data. The high resolution video data is supplied in a image processor 30 to undergo color correction and resolution conversion process, and once stored in a buffer 31, and the image data stored in the buffer 31 is transferred to an external device through an interface 32.

A CPU 33 controls the entire operation of the image reading apparatus. Actuator driving waveform information (pattern data) is written into a pattern memory 35 by the CPU 33, and its period and amplitude are given from the CPU 33 to a driving waveform generator 34, by which a driving waveform is generated. This driving waveform is amplified in an actuator driver 36, and drives an actuator 26 (see a block diagram in FIG. 15). A reading reference signal generator 37 issues Hsync 38 pulse in a specified period depending on the value preliminarily written by the CPU 33. This Hsync 38 gives a one-line period, and is used in various modules as one-line start signal of image data processing in this image reading apparatus.

A buffer state controller 39 monitors the situation of use of the buffer 31, checking whether it is full or empty, and reports the result to the CPU 33. A motor controller 40 controls the position (motor driving position=carriage 3 position) depending on the driving speed and drive of a stepping motor 41.

Figure 16:
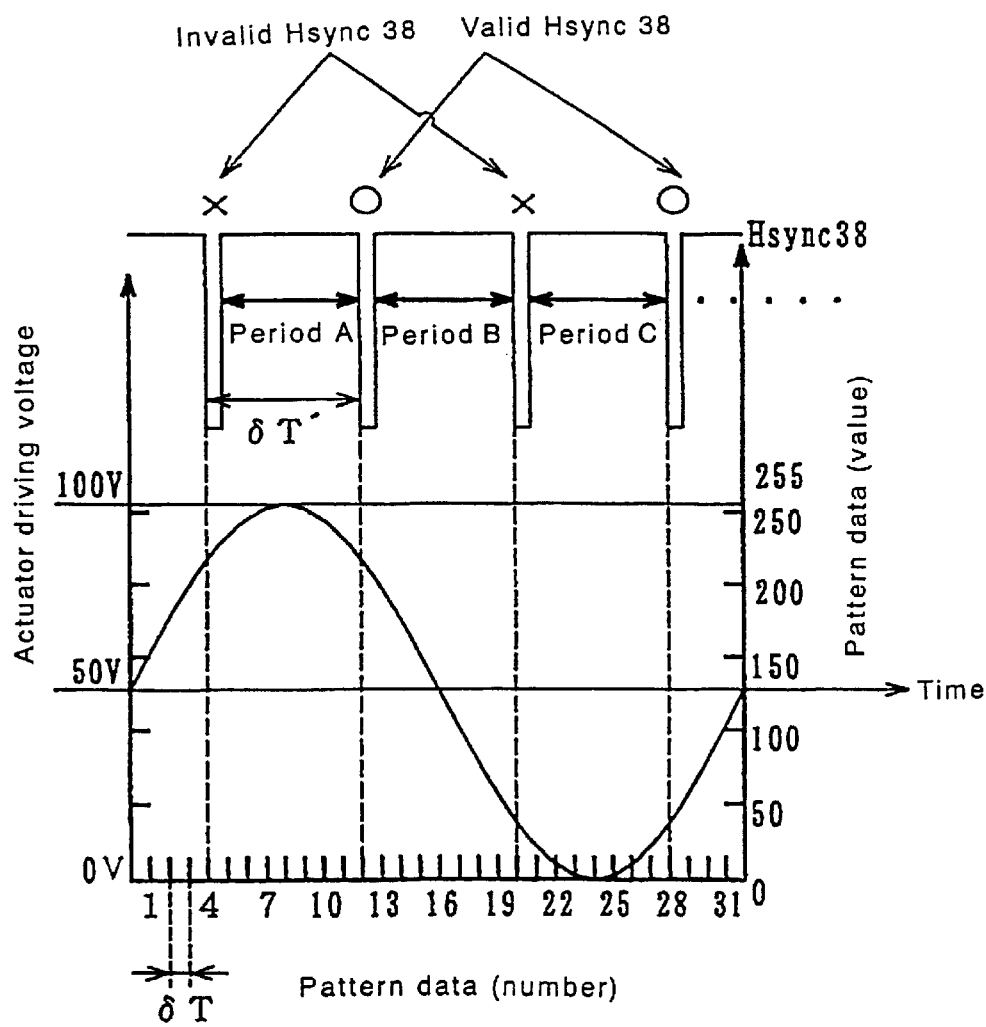
FIG. 16 is a diagram showing pattern data and actuator driving waveform.

Driving pattern data written in the pattern memory 35 is composed of 32 bytes as shown in FIG. 16 (pattern numbers 0 to 31), and stored in corresponding addresses sequentially from the beginning of the pattern memory 35. As the pattern data stored in the pattern memory 35 is issued at specified time intervals, an arbitrary driving waveform (a sinusoidal wave in FIG. 16) is generated. Moreover, the CPU 33 writes a pattern updating period δT and a pattern data update start number (pattern number=4 in FIG. 16) into the actuator driving waveform generator 34 and write a generating period δT' of Hsync 38 in the reading reference signal generator 37. The pattern updating period δT and the generate period δT' of Hsync 38 must have a strict integer ratio in order to synchronizing actuator driving with Hsync.

In the example FIG. 16, this ratio is 8, and whenever the actuator driving waveform generator 34 updates the pattern data eight times, Hsync 38 is generated once. Thus, when the pattern data is updated 32 times, that is, in one period of waveform set in the actuator driving waveform generator 34, Hsync 38 is generated four times, and the phase relation is completely synchronized.

When the CPU 33 starts the operation of the reading reference signal generator 37, generation of Hsync 38 is started. The CPU 33 detects the generation of Hsync 38 by interruption, and immediately starts the operation of the actuator driving waveform generator 34.

Once starting the operation, the actuator driving waveform generator 34 takes out the pattern data stored in the pattern memory 35 sequentially from the update starting number in every δT time, and converts ID/A (D/A converter not shown), and issues to the actuator driver 36. When the accessed pattern number. exceeds 31, it returns to the beginning number of 0. The actuator driver 36 amplifies the input level signal, and drives the actuator 26. In the image reading apparatus of the embodiment, the actuator driver 36 drives the actuator 26 by the signal of ±50 V centered on 50 V. As a result, this signal is converted to the moving amplitude of the image sensor 16, and from 0 V to 100 V of the signal in this example, the image sensor 16 moves by ½ of pixel spacing in the main scanning direction.

By this process, as shown in FIG. 16, updating of Hsync 38 and pattern data is completely synchronized. Moreover, the CPU 33 starts generation of Hsync 38 at an arbitrary moment, and can start the reciprocal motion of the image sensor 16 by driving the actuator 26 synchronized with this Hsync 38. Thus, the image sensor 16 reciprocally moves securely in the main scanning direction, but if the image is read while moving, the image is blurred due to integration effect, and to prevent this, it is necessary to read the image at position of small moving speed, or in the case that the driving waveform is a sinusoidal wave as shown in FIG. 16, near the two apex points. Accordingly, of period A, period B, period C, . . . , the image reading data is made valid, limiting to period A and period C. Therefore, the subsequent data processing is executed according to Hsync 38 at the position indicated by ◯-mark in FIG. 16.

As described herein, the checkered pixel plane of the reading image shown in FIG. 6 is obtained.

Improvement of Actuator Driving Waveform

A method of improving the driving waveform of the actuator is described below.

Figure 17:
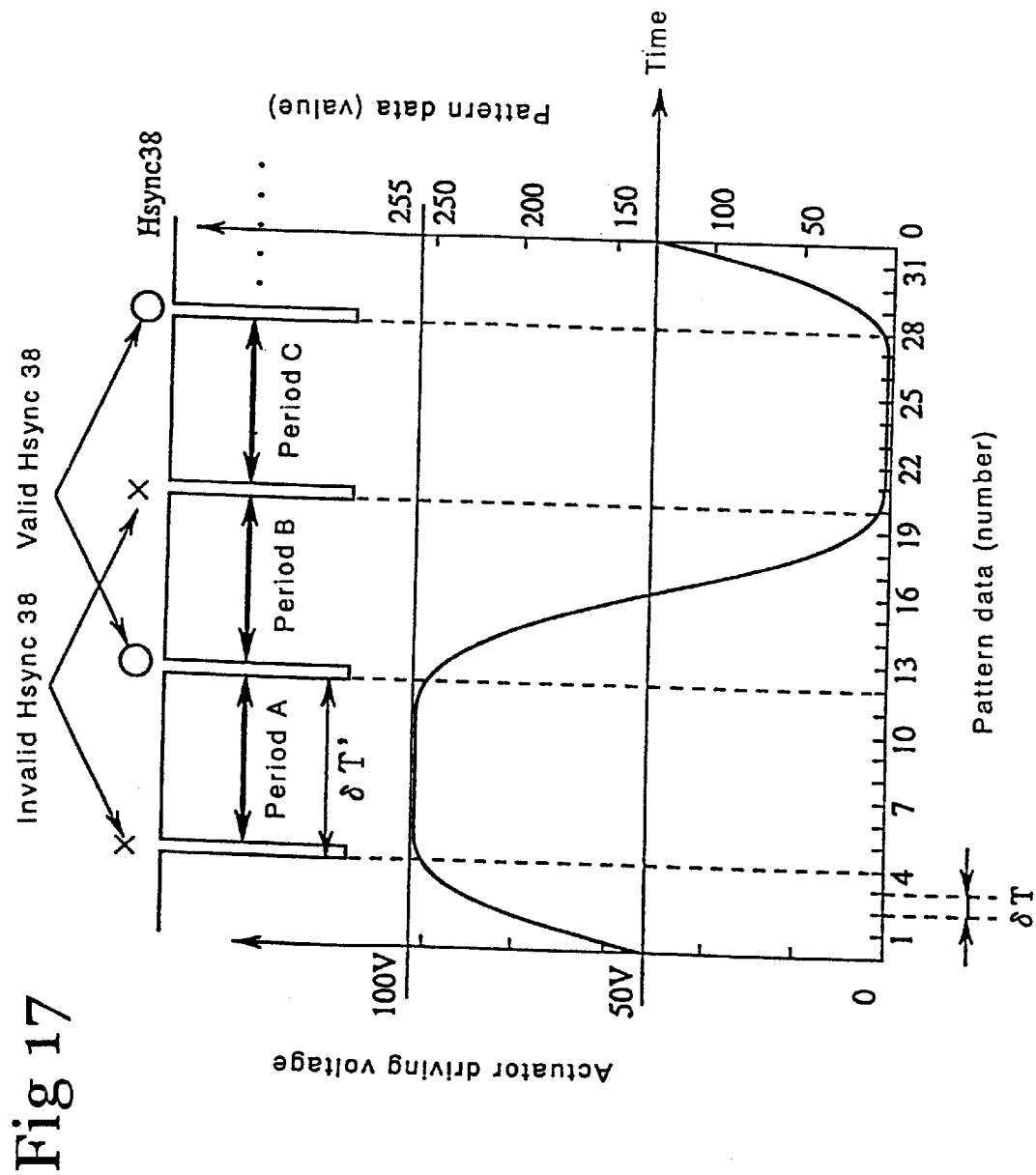
FIG. 17 is a diagram showing an actuator driving waveform capable of decreasing the integration effect.

As mentioned above, if the image sensor 16 reads the image while moving, the image is blurry due to integration effect. To prevent it, in this example, a sinusoidal wave is used as the actuator driving waveform, and it is intended to read the image near the apex of the sinusoidal wave. Further, by modifying the actuator driving waveform, image quality deterioration due to integration effect can be more effectively reduced. FIG. 17 is a diagram showing an example of actuator driving waveform capable of reducing the integration effect. The waveform is generally flat in the image reading section A and section C, and shows fast moving in section B not reading the image. By connecting waveform between the fast moving section and both ends of the flat section A and section C with a smooth waveform like sinusoidal, the image sensor can be moved at high speed while reducing undesired vibration such as ringing. Therefore, the actuator driving waveform in section A and section C is generally flat, and is free from unnecessary vibration due to sudden speed changes, so that the image sensor 16 can read the image almost in stationary state, thereby obtaining favorable pixel data.

By such actuator driving waveform, the actuator 26 moves reciprocally in every effective line, and the image sensor 16 reads the image by displaying only about half of the size of one pixel in every effective line.

In this way, the checkered pixel plane composed of pixels of good quality read from the image is obtained.

Synchronizing Method of Reading Line and Sensor Displacement

This is to describe the method of synchronizing the reading line and line image sensor displacement.

The following table shows the correspondence between the pixel symbols in FIG. 7 described in the outline of interpolating method and used in explanation of each interpolating method and pixel symbols in FIG. 7 showing the reading pixels and interpolating pixels.

TABLE

Correspondence table of pixel symbols in FIG. 8 and pixel symbols in FIG. 7

| Pixel symbol No. | Pixel symbol in FIG. 8 | Pixel symbol in FIG. 7 Odd-number line | Pixel symbol in FIG. 7 Even-number line |
|---|---|---|---|
| 1 | Xc | Xij | Xij |
| 2 | Pn | P(i − 1)j | P(i − 1)j |
| 3 | Pw | Pij | Pi(j − 1) |
| 4 | Pe | Pi(j + 1) | Pij |
| 5 | Ps | P(i + 1)j | P(i + 1)j |
| 6 | Xnw | X(i − 1)j | X(i − 1)(j − 1) |
| 7 | Xne | X(i − 1)(j + 1) | X(i − 1)j |

It is apparent from this table that the corresponding relationship of pixel symbols differs between odd-number line and even-number line in FIG. 7 s compared with pixel symbols in FIG. 8, except for pixel symbol numbers 1, 2 and 5. This is because the pixel is read in the even-number line by moving to the right in the horizontal direction from the odd-number line by ½ of pixel spacing on the line sensor. It is hence known that same processing cannot be done in odd-number and even-number lines.

Although a method of processing by recognizing the odd and even lines on the circuit technique can be adopted, but below s shown a method of establishing the position of line image sensor always at a specified position when reading a first line, that is, an odd-number line.

Figure 18:
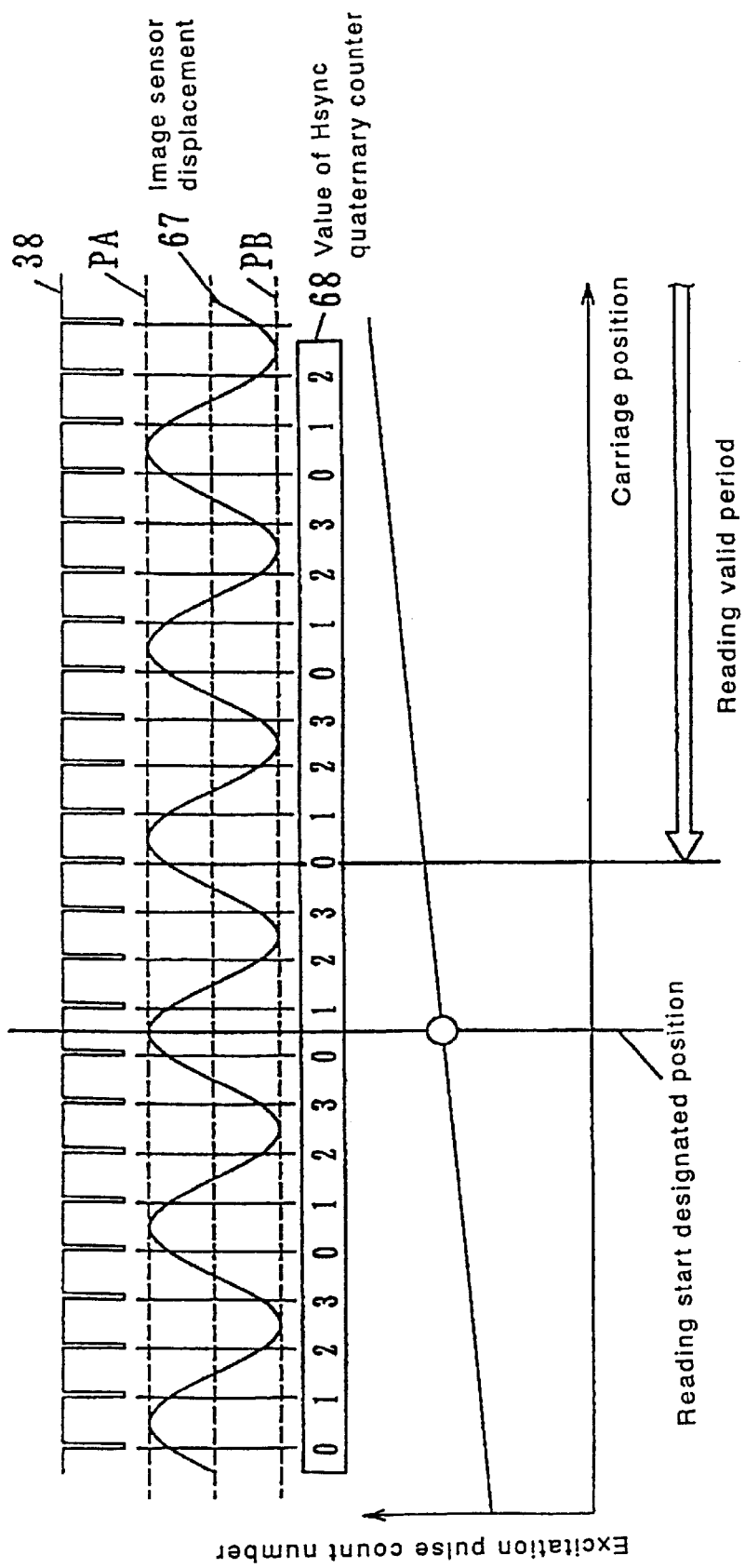
FIG. 18 is an explanatory diagram showing a control method of image sensor displacement at reading start point.

In FIG. 18, reference numeral 67 denotes displacement of main scanning direction of the image sensor, and PA and PB are image reading positions at both ends. Reference numeral 38 is a, waveform of Hsync. When the image sensor 16 reads the first and odd-number lines at the PA position, the interpolating methods described above can be applied, but when reading at the PB position, the foregoing pixel interpolating methods cannot be applied.

First is explained about the process after the carriage 3 has reached the specified reading start position. As explained in FIG. 16, Hsync 38 and image sensor position 67 are synchronized before the carriage 3 reaches the reading start position. Already explained above, the (CPU 33 detects first Hsync 38 as interrupt and clears the internal Hsync quaternary counter (count value shown in 68 in FIG. 18) to 0 upon starting point of operation of the actuator driving waveform generator 34, and counts by quaternary notation (from 0 to 3) in Hsync 38.

As the CPU 33 counts the notice signals issued from the motor controller 40, it detects that the carriage 3 has reached the reading start specified position, and when the Hsync quaternary counter value 68 reaches 0 as being counted by interruption If Hsync 38, that is, at the moment of the image sensor at PA position, reading operation is started. Thus, at the first reading line, the image sensor displacement 67 is always at PA position. Thereafter, reading the image at positions of PB, PA, PB, . . . , the image sensor displacement on odd and even lines maintains the specified relation, so that the pixel value interpolating method described above can function normally.

Reading Interrupt, Resume Processing

When restarting reading after interruption of image reading, a method of controlling securely the carriage position and line image sensor displacement is described below.

In the case of the image reading apparatus connected to the host system, if the processing speed of the host system side is slow and the image data from the image reading apparatus cannot be received, the image reading apparatus stores data temporarily in the buffer 31 shown in FIG. 15 if it is not full. But when this buffer 31 becomes full, the image reading apparatus 1 temporarily interrupts the image reading operation. Consequently, when the host system reads in the image data stored in the buffer 31 through the interface 32, and the buffer 31 becomes somewhat empty, the image reading apparatus 1 resumes (restarts) the image reading operation.

When resuming the reading operation, it is necessary to control the position of the carriage 3 and the direction of the image sensor displacement 67 securely. For this purpose, the CPU 33 detects transfer to the buffer full state by the interrupt signal (buffer monitor signal) generated by the buffer state controller 39 which controls the state of the buffer 31, and interrupts reading, but the precise position information of the carriage 3 at this time and the Hsync quaternary counter value are measured and stored. Afterwards, the CPU 33 drives the carriage 3 in a reverse direction of reading direction by a slight amount, and gets ready for restart of reading. By the buffer monitor signal checking periodically, when the cancellation of buffer full state (buffer empty) is detected, the CPU 33 drives again the carriage 3 at the specified speed in the reading direction. According to the precise position information of the carriage and the Hsync quaternary counter value, reading is resumed from the next line of occurrence of buffer full state in the specified image sensor displacement direction.

In this way, even if reading is interrupted, image reading can be continued favorably, with keeping continuity of a straight line on the original and without difficulty in application of the pixel value interpolating method.

Figure 20:
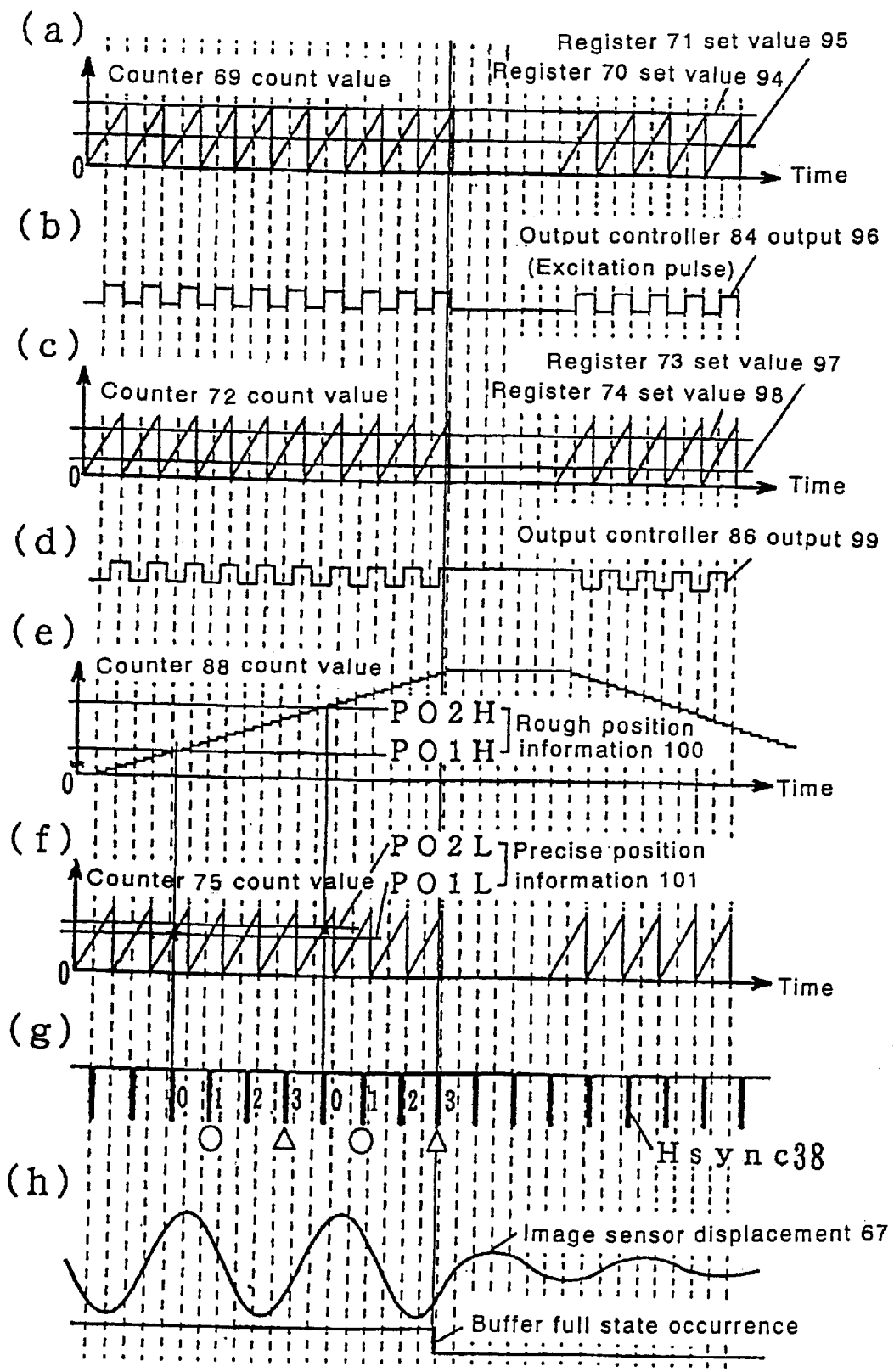
FIGS. 20(a), (b), (c), (d), (e), (f), (g), (h) are timing diagrams showing operation of motor controller during interruption of image reading.
Figure 21:
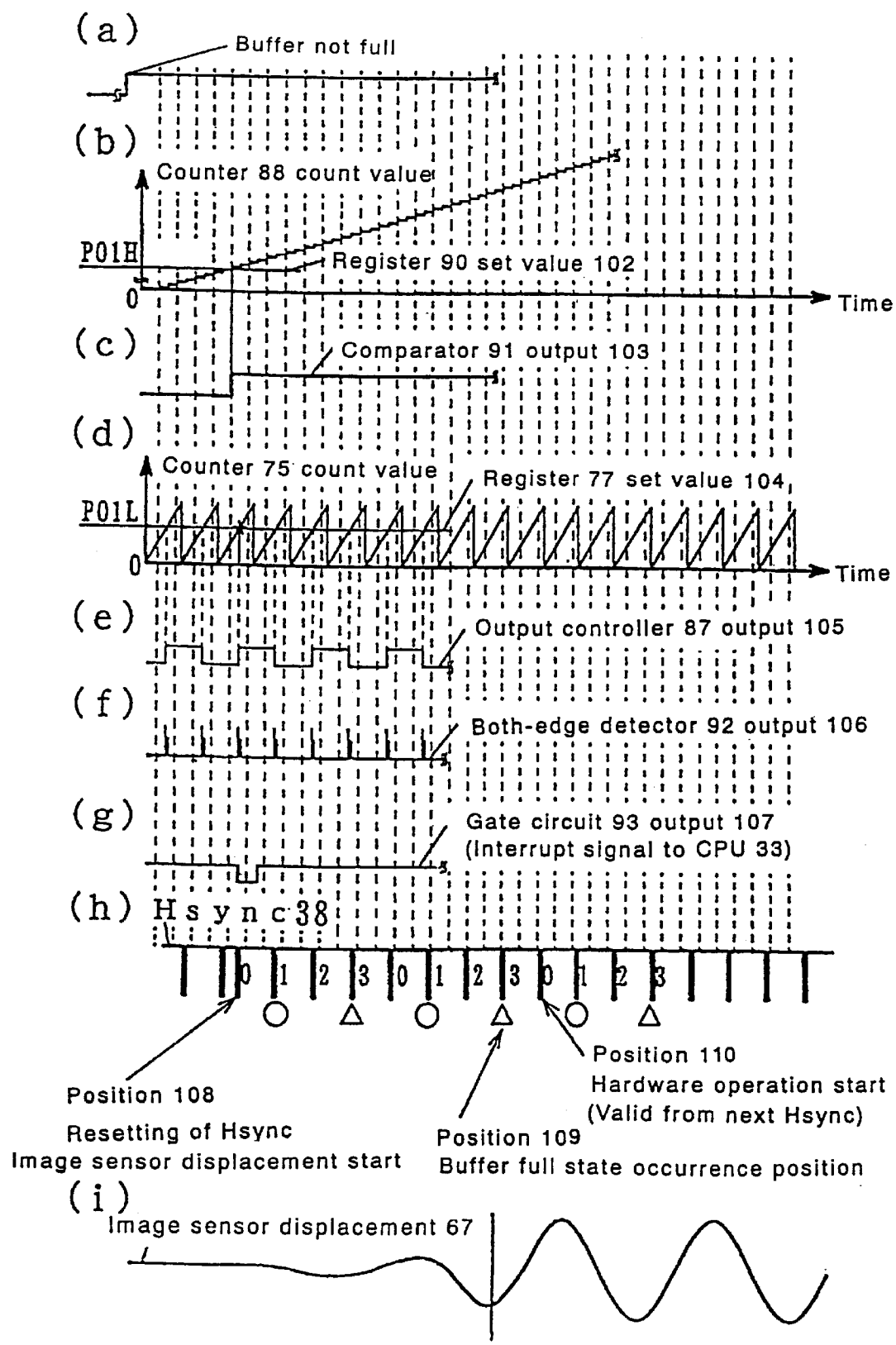
FIGS. 21(a), (b), (c), (d), (e), (f), (g), (h), (i) are timing diagrams showing operation of motor controller when resuming image reading.

The reading interrupting and resuming process is further described below while referring to FIG. 19, FIG. 20 and FIG. 21.

Figure 19:
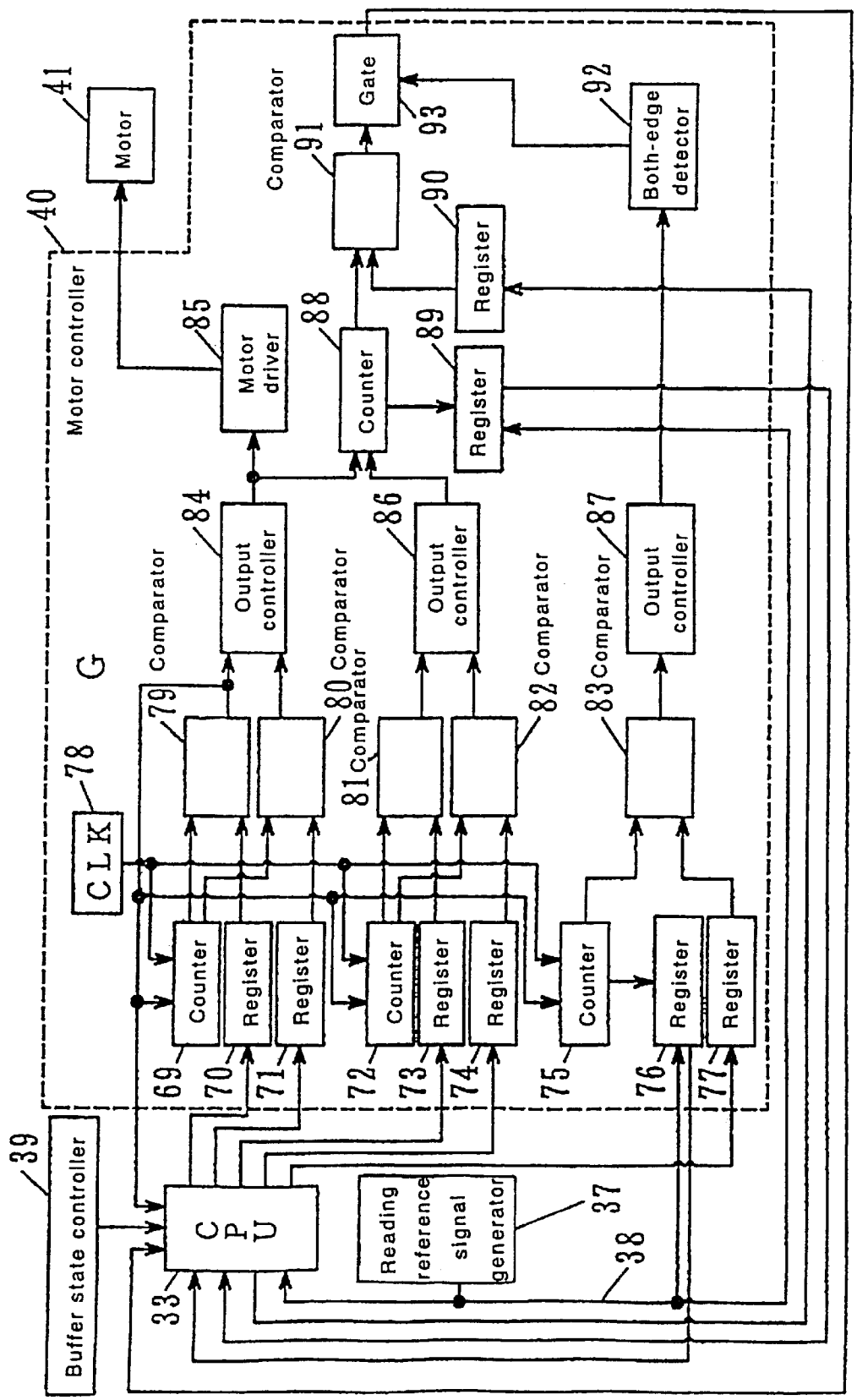
FIG. 19 is a block diagram showing the detail of motor, controller in FIG. 15.

A counter 69, a counter 72, and a counter 75 shown in FIG. 19 count up as shown in FIG. 20(a), (c), (f), respectively by the clock signal generated by a clock signal generator 78. A set value 94 is stored in a register 70, and when the count value of the counter 69 reaches the set value 94, the counter 72 and counter 75 are reset to 0 together with the counter 69 by the coincidence signal issued from a comparator 79, and starts to count-up again.

In a register 71, a set value 95 of half of the set value 94 is stored. The comparator 79 issues a coincidence signal when the count value of the counter 69 and the set value 94 of the register 70 are matched, and a comparator 80 issues a coincidence signal when the count value of the counter 69 and the set value 95 of the register 71 are matched, and they are fed into an output controller 84. The output controller 84 renders the output High by the coincidence signal from the comparator 80, and renders the output Low by the coincidence signal from the comparator 79. Thus, a pulse train of output 96 (FIG. 20(b)) of the output controller 84 is obtained. This output 96 is fed into the motor driver 85, and controls the rotation of the motor 41.

Incidentally, a set value 97 of a register 73 is set as
Set value 97=(set value 94+set value 95)/2, and a set value 98 of a register 74 is set as
Set value 98=set value 95/2.

A comparator 81, when the count value of the counter 72 and the set value 97 of the register 73 are matched, issues a coincidence signal, and a comparator 82 issues a coincidence signal when the count value of the counter 72 and the set value 98 of the register 74 are matched, and they are fed into an output controller 86. The output controller 86 renders the output High by the coincidence signal from the comparator 82, and renders the output Low by the coincidence signal from the comparator 81. Thus, a pulse train of output 99 (FIG. 20(d)) of the output controller 86 is obtained.

By thus defining the relationship of the set value 94, set value 95, set value 97, and set value 98, as shown in FIG. 20(b) and (d), the pulse train of the output 99 of the output controller 86 is set at a phase difference of 90° delay of the pulse train of the output 96 of the output controller 84.

The output 96 of the output controller 84 and the output 99 of the output controller 86 are fed in the counter 88, and the counter 88 which is a phase counter functions as up- or down-counter depending on the phase difference of two inputs. The count value of the counter 88 is stored in the register 89 at every input of Hsync 38, and when interruption occurs by Hsync 38, the CPU 33 reads the value of the register 89 only when the Hsync quaternary counter value explained in FIG. 18 is 0, and stores, for example, two past values (PO1H and PO2H (FIG. 20(e)) as rough position information 100). Since the values of PO1H and PO2H are count values being counted up at every motor drive step, the carriage position upon occurrence of Hsync 38 is measured roughly.

On the other hand, upon every input of Hsync 38, the count value of the counter is stored in the register 76, and when interruption occurs by the Hsync 38, the CPU 33 reads the value of the register 76 only when the Hsync quaternary count value explained in FIG. 18 is 0, and stores, for example, two past values (PO1L and PO2L (FIG. 20(f)) as precise position information 101). Although the precise position information 101 does not directly express the motor driving status, the motor is driven almost at uniform speed in the driving pulse period issued to the motor and the motor power is transmitted through a belt or the like, and therefore the finally driven carriage is regarded to be driven art almost uniform speed, so that the precise position information 101 may be assumed to be the interpolation information of the carriage position between motor excitation pulses. In other words, POP1L and PO2L precisely measures the carriage position upon occurrence of Hsync 38.

In the image reading apparatus of the embodiment, the hardware is designed so that the image data may be valid up to Hsync 38 just before the buffer full state. The generation of buffer full state is fed from the buffer state controller 39 to the CPU 33, but when the buffer full state occurs, the hardware reads the image data and stops data processing without resort to the CPU 33.

When the CPU 33 detects the buffer full state, it stops driving of the actuator and stops the image sensor displacement 67, and the motor 41 is stopped immediately, and the output signal generation rule of the output controller 86 is changed, so that the pulse train of reverse polarity is issued. As a result, the pulse train of the output 99 of the output controller 86 is advanced in phase by 90 degrees from the pulse train of the output 96 of the output controller 84 and the phase deviation direction is reverse, and therefore the counter 88 which is the phase counter functions as a down-counter.

The CPU 33 stores the Hsync quaternary count value when the buffer full state occurs (3 in the example of FIG. 20(g)). Consequently, the CPU 33 drives the motor in reverse direction of the reading direction, and moves the carriage 3 to an upstream position (reverse direction of reading direction) from the already stored PO1H and PO1L positions, and then stops the motor 41 and waits for cancellation of buffer full state.

The operation when the buffer full state is canceled is described below while referring to FIG. 19 and FIG. 21. FIG. 21(a) to (i) are timing charts showing the operation of the motor controller 40 at the buffer full cancellation point.

When recognizing cancellation of buffer full state transmitted from the buffer state controller 39, the CPU 33 writes the PO1H in as a set value 102 of the register 90, and further writes POlL as a set value 104 of the register 77 (FIG. 21(b), (d)). The motor 41 returning to a position in a reverse direction of the reading direction is driven in the reading direction.

By writing PO1L as the set value 104 of the register 77, the comparator 83 drives the motor 41, and issues a coincidence signal to the output controller 87 when the values of the counter 75 repeating counting up and resetting and the value of register 77 are matched. The output controller 87 issues so-called toggle signals, repeating Low and High alternately upon every reception of coincidence signal (output 105 of output controller 87 shown in FIG. 21(e)). Both edges of this toggle signal are detected by a both-edge detector 92, and pulse signals corresponding to both edge positions are issued (output 106 of both-edge detector 92 shown in FIG. 21(f)).

On the other hand, by writing PO1H as the set value 102 of the register 90, the comparator 91 compares the value of the counter 88 counted up with driving the motor 41 and the value set in the register 90, and when coinciding, issues a coincidence signal to the gate circuit 93 (output 103 of comparator 91 shown in FIG. 21(c)). In the gate circuit 93, after the output 103 of the comparator 91 is entered, an interruption signal is generated to the CPU 33 when the next output 106 of the both-edge detector 92 occurs (output 107 of gate circuit 93 shown in FIG. 21(g)). The CPU 33, when detecting this interruption signal at the position indicated by position 108, resets the Hsync 38, and starts driving of actuator in the method already explained in FIG. 16, and starts the image sensor displacement 67. The image sensor displacement 67 does not respond in real time right after output of the pattern data for displacement to the actuator, but displaces in specified amplitude if there is time for about two cycles.

As mentioned above, the CPU 33 stores the buffer full state occurrence position as the position 109 shown in FIG. 21(h) according to the Hsync quaternary count value. Since the buffer full state occurs on the effective final line, the line to be read next is the second Hsync position after the position 109 (in FIG. 21(h), only Hsync indicated by circle or triangle mark is valid). Therefore, the CPU 33 starts hardware operation right after detection of Hsync of position 110 in FIG. 21(h), and the image data can be read accurately from the next line of the buffer full state occurrence line.

Thus, while reading the image, according to the reference value of the Hsync quaternary count value, the precise position information of the carriage is measured and stored, and upon occurrence of buffer full state, the carriage is returned by a slight distance, and according to the stored carriage position information, the Hsync is reset, and by further controlling the image sensor displacement, when the carriage reaches the line position to be read after cancellation of buffer full state, the image sensor displacement (and amplitude) can be restored to the normal state. Thus, if buffer full state should occur, it is possible to be continued to read the image favorably.

INDUSTRIAL APPLICABILITY

As described rein, the invention presents a novel method of displacing adequately a line image sensor when reading image and obtaining a checkered pixel plane, by displacing reciprocally in a distance of half pixel spacing also in the main scanning direction when moving the line image sensor at every half of the pixel spacing of the sensor in the sub-scanning direction, and a method of obtaining a checkered pixel plane of good quality by improvement of control method when interrupting and resuming and also a new method of interpolating the pixels in the interval of the pixel plane. The principle of the interpolating method is a method of enhancing the resolution in the main and sub-scanning directions by selecting and interpolating the optimum one of the plural interpolation candidate values by making use of the information of the read checkered pixels in the main and sub-scanning directions, and particularly reproducing the edges of the original image at an excellent contrast. It contributes to advancement of three electronic society, in particular, the multimedia society.

What is claimed is:

1. An image reading apparatus comprising:

a light source illuminating a placed original, a line image sensor having photoelectric converters arranged in a line, which reads a line of the original with its reflected light or transmitted light, a moving mechanism moving the line image sensor in orthogonal direction of line direction, which reads the original line by line, whereby reads the original into a two-dimensional image plane, an actuator displacing the said line image sensor slightly in the line direction by every line, whereby reading the image in a checkered pattern of pixels at different position in every line, and interpolating means for interpolating a pixel in spaces of the checkered pattern of read-in pixels, which determines plural interpolation candidate values for the pixel values of pixels around the pixel position to be interpolated, except pixels at specified positions, selects one of the said candidate values according to the pixel around the pixel position to be interpolated, and interpolates the pixel position to be interpolated with the selected pixel value;

wherein the said interpolation candidate values are average values of plural set of two pixels around the pixel position to be interpolated, the set of two pixels of the smallest difference among the sets of two pixels is determined, and the interpolation candidate value obtained from the set of two pixels is selected.

2. An image reading apparatus according to claim 1, wherein the said interpolation candidate values are average values of each set of two pixels of all of adjacent four pixels to the pixel position to be interpolated.

3. An image reading apparatus according to claim 2, wherein the set of two pixels of minimum difference is determined among sets of two pixels, and when the set of two pixels is in the line direction or orthogonal to the line direction, the interpolation candidate value obtained from the set of two pixels is selected, or when the determined set of two pixels crosses diagonally to the liner direction, the interpolation candidate value is selected by referring to the value of the pixels already interpolated in the direction.

4. An image reading apparatus according to claim 1, wherein the staid interpolation candidate values are average values of each set of two pixels in a line direction and in its orthogonal direction among adjacent four pixels to the pixel position to be interpolated.

5. An image reading apparatus according to claim 1 wherein the said pixels of a specified positions are pixels on four borders of a image plane, and the said pixels are interpolated by using values of sets of two adjacent pixels in the border direction.

6. An image reading apparatus according to claim 1, wherein the said actuator displaces a line image to a specified position on a first line to be read.

7. An image reading apparatus according to claim 1, wherein if interruption occurs in the midst of image reading action, the said actuator displaces the said line image sensor to the displacing position at the moment of interruption when reading a first line after restart.

8. An image reading apparatus according to claim 1, wherein the said actuator controls move of the line image sensor in the line direction effectively in a stopped state during image reading period of a line.

9. An image reading apparatus comprising:

a light source illuminating a placed original, a line image sensor having photoelectric converters arranged in line, which reads a line of the original with its reflected light or transmitted light, a moving mechanism moving the line image sensor in orthogonal direction of line direction, which reads the original line by line, whereby reads the original into a two-dimensional image plane, an actuator displacing the said line image sensor slightly in the line direction by every line, whereby reading the image in a checkered pattern of pixels at different position in every line, and interpolating means for interpolating a pixel in spaces of the checkered pattern of read-in pixels, which determines plural interpolation candidate values for the pixel values of pixels around the pixel position to be interpolated, except pixels at specified positions, selects one of the said candidate values according to the pixel around the pixel position to be interpolated, and interpolates the pixel position to be interpolated with the selected pixel value;

wherein in case of reading the original into plural primary color image planes, the said interpolating means determines plural interpolation candidate values in each one of plural primary color planes, selects one of the said candidate values is selected according to the luminosity value of the pixels around the pixel position to be interpolated, and interpolates the pixel position to be interpolated in each primary color plane with the each selected candidate value.

10. An image reading apparatus comprising:

a light source illuminating a placed original, a line image sensor having photoelectric converters arranged in line, which reads a line of the original with its reflected light or transmitted light, a moving mechanism moving the line image sensor in orthogonal direction of line direction, which reads the original line by line, whereby reads the original into a two-dimensional image plane, an actuator displacing the said line image sensor slightly in the line direction by every line, whereby reading the image in a checkered pattern of pixels at different position in every line, and interpolating means for interpolating a pixel in spaces of the checkered pattern of read-in pixels, which determines plural interpolation candidate values for the pixel values of pixels around the pixel position to be interpolated, except pixels at specified positions, selects one of the said candidate values according to the pixel around the pixel position to be interpolated, and interpolates the pixel position to be interpolated with the selected pixel value;

wherein in case of reading the original into plural primary color image planes, the said interpolating means determines plural interpolation candidate values in each one of plural primary color planes, selects one of the said candidate values is selected according to the value of the pixels around the pixel position to be interpolated, in a predetermined primary color plane, and interpolates the pixel position to be interpolated in each primary color plane with the each selected candidate value.

* * * * *